(12) United States Patent
Hull et al.

(10) Patent No.: US 12,510,556 B2
(45) Date of Patent: Dec. 30, 2025

(54) MICRO-ELECTRICAL-MECHANICAL-SYSTEMS (MEMS) ACCELEROMETER SYSTEMS

(71) Applicant: Atlantic Inertial Systems Inc., Cheshire, CT (US)

(72) Inventors: Richard A. Hull, Kissimmee, FL (US); Vasileios Tsachouridis, Cork (IE)

(73) Assignee: ATLANTIC INERTIAL SYSTEMS, INC., Cheshire, CT (US)

( * ) Notice: Subject to any disclaimer, the term of this patent is extended or adjusted under 35 U.S.C. 154(b) by 358 days.

(21) Appl. No.: 18/298,444

(22) Filed: Apr. 11, 2023

(65) Prior Publication Data

US 2024/0345124 A1    Oct. 17, 2024

(51) Int. Cl.
  *G01P 1/00*  (2006.01)
  *G01P 15/08* (2006.01)
  *G01P 15/125* (2006.01)

(52) U.S. Cl.
  CPC ............ *G01P 1/006* (2013.01); *G01P 15/125* (2013.01); *G01P 2015/0805* (2013.01)

(58) Field of Classification Search
  None
  See application file for complete search history.

(56) References Cited

U.S. PATENT DOCUMENTS

| | | | | |
|---|---|---|---|---|
| 5,038,306 A | * | 8/1991 | Kellett | G01P 1/006 |
| | | | | 188/278 |
| 5,600,066 A | * | 2/1997 | Torregrosa | G01P 15/131 |
| | | | | 73/514.32 |
| 7,181,852 B2 | | 2/2007 | Bryan | |
| 7,267,006 B2 | | 9/2007 | Malvern | |
| 7,386,395 B1 | | 6/2008 | Masson | |

(Continued)

FOREIGN PATENT DOCUMENTS

EP    4339621 A1    3/2024

OTHER PUBLICATIONS

Search Report issued in European Patent Application No. 24169716.8; Application Filing Date Apr. 11, 2024; Date of Mailing Aug. 13, 2024 (9 pages).

*Primary Examiner* — Giovanni Astacio-Oquendo
*Assistant Examiner* — Carl F. R. Tchatchouang
(74) *Attorney, Agent, or Firm* — CANTOR COLBURN LLP

(57) ABSTRACT

A Micro-Electrical-Mechanical-Systems (MEMS) accelerometer system includes a proof-mass device having a proof-mass that moves from an initial position in response to an input acceleration, a transducer connected to the proof-mass device to output a transducer signal correlating to movement and/or position of the proof-mass, and a driver configured to drive the proof-mass. A controller actively controls the driver to actively drive the proof-mass toward an initial position, and actively adjusts the drive signal based on a temperature signal (T) indicative of given temperature, a transducer voltage signal (Vref) indicative of a transducer voltage reference, and the transducer signal to actively generate a corrected drive signal and delivers the corrected drive signal to the driver to actively control the driver. The controller can also utilize a robust loop-shaping stabilization operation to produce both an unfiltered estimate of the input acceleration and an uncorrected drive signal to stabilize the proof mass.

20 Claims, 17 Drawing Sheets

(56) References Cited

U.S. PATENT DOCUMENTS

| | | |
|---|---|---|
| 8,086,328 B2 | 12/2011 | Rojo |
| 9,201,091 B2 | 12/2015 | Malvern |
| 9,696,340 B2 | 7/2017 | Trusov et al. |
| 9,927,458 B2 | 3/2018 | Bramhavar et al. |
| 10,209,270 B2 | 2/2019 | Malvern |
| 10,247,554 B2 | 4/2019 | Senkal et al. |
| 10,670,623 B2 | 6/2020 | Harish et al. |
| 10,775,404 B2 | 9/2020 | Townsend et al. |
| 10,816,568 B2 | 10/2020 | Koenigsberg et al. |
| 10,900,994 B2 | 1/2021 | Malvern |
| 11,249,106 B2 | 2/2022 | Fell et al. |
| 11,493,534 B1 | 11/2022 | Sorenson et al. |
| 2007/0028689 A1* | 2/2007 | Vrcelj ............... G01P 15/132 341/145 |
| 2012/0133448 A1 | 5/2012 | Gregg et al. |
| 2019/0242925 A1 | 8/2019 | Malvern |
| 2020/0064136 A1 | 2/2020 | Henderson |
| 2022/0397395 A1 | 12/2022 | Avantaggiati |

\* cited by examiner

MICRO-ELECTRICAL-MECHANICAL-SYSTEMS (MEMS) ACCELEROMETER SYSTEMS

BACKGROUND

This disclosure relates to Micro-Electrical-Mechanical-Systems (MEMS) accelerometer systems.

In traditional MEMS accelerometers, external applied specific acceleration (hereafter called the input acceleration) displaces a proof-mass and varies the distance of the formed capacitor plates, and hence the overall capacitance. The above capacitance variation is transduced to an electrical voltage by a displacement transducer (e.g., a pick-off transducer) which can then be used by a control system in order to excite a drive force transducer to apply an appropriate electrical force (and acceleration) to balance the proof-mass into a desired zero position. The purpose of the accelerometer device is to sense the input acceleration and output an accurate estimate of the input acceleration which may either be used by another system, recorded, transmitted or displayed as required.

SUMMARY

According to a non-limiting embodiment, a Micro-Electrical-Mechanical-Systems (MEMS) accelerometer system includes a proof-mass device having a proof-mass configured to move from an initial position in response to an input acceleration, a transducer operatively connected to the proof-mass device to output a transducer signal correlating to movement and/or position of the proof-mass, and a driver is configured to drive the proof-mass. A controller actively controls the driver to actively drive the proof-mass toward an initial position, and actively adjusts the drive signal based on a temperature signal (T) indicative of given temperature, a transducer voltage signal (Vref) indicative of a transducer voltage reference, and the transducer signal to actively generate a corrected drive signal and delivers the corrected drive signal to the driver to actively control the driver.

In additional embodiments, or as an alternative, the controller utilizes a robust loop-shaping stabilization operation to produce both an unfiltered estimate of the input acceleration and an uncorrected drive signal to stabilize the proof mass.

In additional embodiments, or as an alternative, the controller processes the unfiltered estimate of the input acceleration with a low pass filter (LPF) and a digital scale factor (DSF) to provide additional noise reduction and scaling to output an estimated acceleration of the input acceleration.

In additional embodiments, or as an alternative, the controller is configured to deterministically estimate the input acceleration based on the transducer signal, and is configured to output an estimated input acceleration signal indicative of the estimated the input acceleration.

In additional embodiments, or as an alternative, the controller determines the estimated input acceleration without implementing a passive observer.

In additional embodiments, or as an alternative, the controller comprises a robust loop-shaping stabilization module configured receive the transducer signal, and based thereon to generate a nominal digital PWM voltage signal indicative of a non-filtered estimation of the input acceleration; and a digital pulse-width modulation (DPWM) correction module configured to receive the temperature signal and the transducer voltage reference, and based thereon to generate a DPWM correction signal indicative of a real-time estimate of the small gap displacement in the proof-mass, wherein the controller generates the corrected drive signal based on the nominal digital PWM voltage signal and the DPWM correction signal.

In additional embodiments, or as an alternative, the controller combines the nominal digital PWM voltage signal with the DPWM correction signal to generate the corrected drive signal.

In additional embodiments, or as an alternative, the digital pulse-width modulation (DPWM) correction module includes a bias acceleration thermal model and a driver model of the driver, and inputs the given temperature and the transducer voltage reference to the bias acceleration thermal model and the driver model so as to generate the DPWM correction signal.

In additional embodiments, or as an alternative, the system further comprises a low-pass filter in signal communication with the robust loop-shaping stabilization module, the low-pass filter configured to filter noise from the nominal digital PWM voltage signal to generate a filtered digital PWM voltage signal and produce the additional noise filtering; and a digital scale factor (DSF) module in signal communication with the low-pass filter, the DSF module configured to apply a gain to the filtered digital PWM voltage signal so as to generate the estimated input acceleration signal.

In additional embodiments, or as an alternative, the gain multiplies the filtered digital PWM voltage signal to produce the scaling which scales the estimated input acceleration signal so as to reduce an error between the filtered digital PWM voltage signal and the input acceleration.

According to another non-limiting embodiment, a method of controlling a MEMS accelerometer system is provided. The method comprises applying an acceleration to a proof-mass device having a proof-mass and moving the proof-mass device from an initial position in response to the acceleration. The method further comprises outputting from a transducer operatively connected to the proof-mass device a transducer signal which correlates to one or both of a movement and a position of the proof-mass, and driving the prof-mass using a driver operatively connected to the proof-mass device. The method further comprises delivering the transducer signal to a controller and actively controlling, by the controller, the driver to actively drive the proof-mass toward an initial position based at least in part on transducer signal. The method further comprises actively adjusting, by the controller, the drive signal based on a temperature signal (T) indicative of a given temperature, a transducer voltage signal (Vref) indicative of a transducer voltage reference, and the transducer signal. The method further comprises actively generating a corrected drive signal in response to adjusting the drive signal, and delivering the corrected drive signal to the driver to actively control the driver.

In additional embodiments, or as an alternative, the method further comprises utilizing, by the controller, a robust loop-shaping stabilization operation to produce both an unfiltered estimate of the acceleration and an uncorrected drive signal to stabilize the proof mass.

In additional embodiments, or as an alternative, the method further comprises processing, by the controller, the estimate of the acceleration with a low pass filter (LPF) and a digital scale factor (DSF) to provide additional noise reduction and scaling to output an estimated acceleration estimate of the acceleration.

In additional embodiments, or as an alternative, the method further deterministically estimates, by the controller, the acceleration based on the transducer signal, outputting, by the controller, an estimated acceleration signal indicative of the estimated the acceleration.

In additional embodiments, or as an alternative, determining, by the controller, the estimated acceleration without implementing a passive observer.

In additional embodiments, or as an alternative, the robust loop-shaping stabilization operation further comprises delivering the transducer signal to a robust loop-shaping stabilization module; generating a nominal digital PWM voltage signal indicative of a non-filtered estimation of the acceleration based on the transducer signal; delivering, to a digital pulse-width modulation (DPWM) correction module, the temperature signal and the transducer voltage reference; generating DPWM correction signal a DPWM correction signal indicative of a real-time estimate of the small gap displacement in the proof-mass based on the temperature signal and the transducer voltage reference; generating, by the controller, the corrected drive signal based on the nominal digital PWM voltage signal and the DPWM correction signal.

In additional embodiments, or as an alternative, combining, by the controller, the nominal digital PWM voltage signal with the DPWM correction signal to generate the corrected drive signal.

In additional embodiments, or as an alternative, generating the DPWM correction signal further comprises: delivering the given temperature and the transducer voltage reference to the digital pulse-DPWM correction module; applying, by the DPWM correction module, a temperature value indicated by the temperature signal to a bias acceleration thermal model; applying, by the DPWM correction module, the transducer voltage reference to a driver model; and generating the DPWM correction signal based on outputs from the bias acceleration thermal model and the driver model.

In additional embodiments, or as an alternative, outputting the estimated acceleration further includes: filtering noise from the nominal digital PWM voltage signal to generate a filtered digital PWM voltage signal to generate a filtered digital PWM voltage signal and produce the additional noise filtering; and applying by a digital scale factor (DSF) module, a gain to the filtered digital PWM voltage signal so as to generate the estimated acceleration signal.

In additional embodiments, or as an alternative, applying the gain includes multiplying a gain value to the filtered digital PWM voltage signal to produce the scaling which scales the estimated acceleration signal so as to reduce an error between the filtered digital PWM voltage signal and the acceleration.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
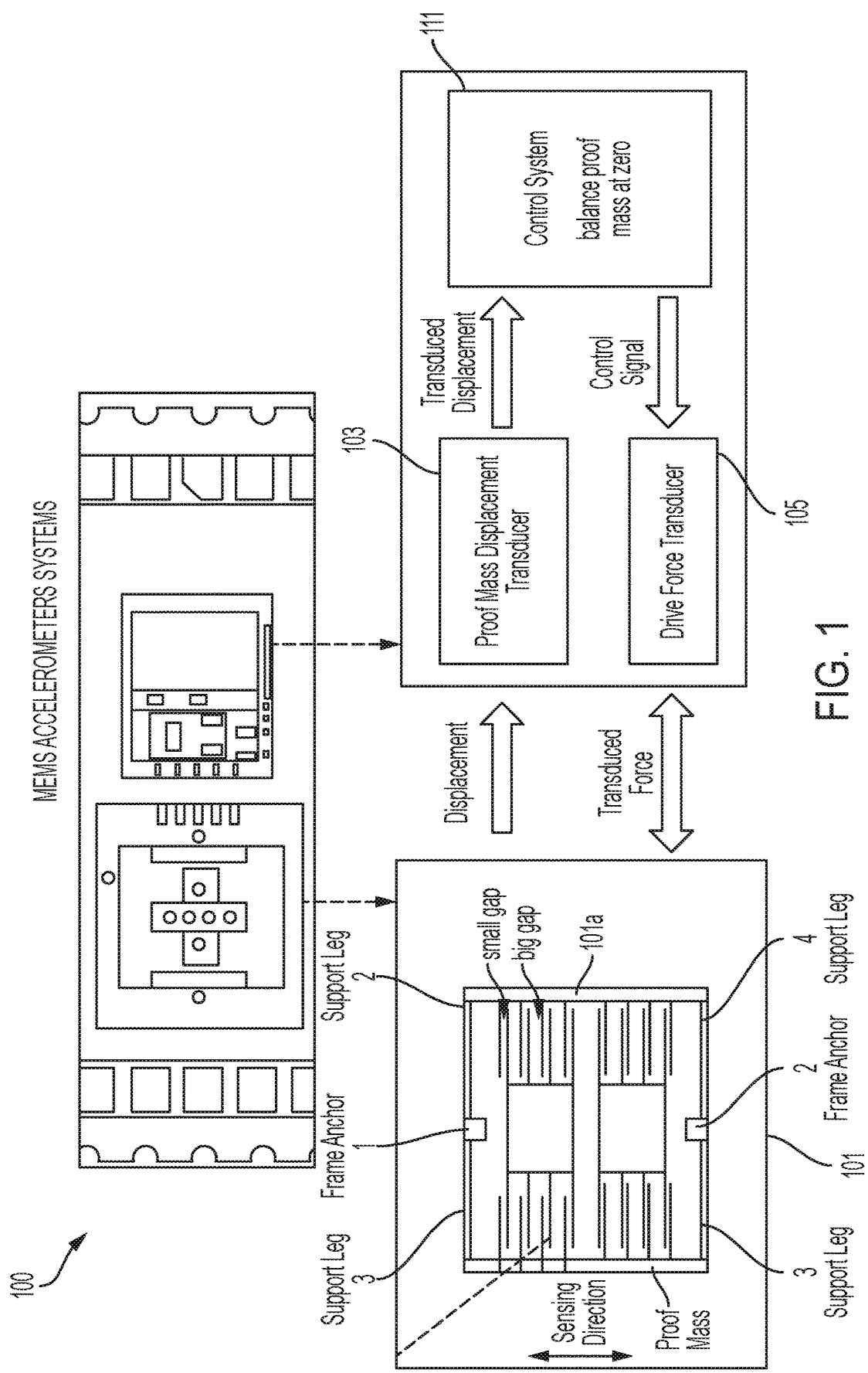
FIG. 1 is a schematic diagram of an embodiment of MEMS accelerometer system in accordance with this disclosure.

Reference will now be made to the drawings wherein like reference numerals identify similar structural features or aspects of the subject disclosure.

A traditional MEMS accelerometer system typically includes a controller that generates an output estimating that accelerating signal that is to be sensed when the system rests in steady state. Thus, the output of the controller is indicative of an estimation of the specific acceleration acting on the device. The controller is designed to operate on the displacement of the proof-mass (a mass-spring damper system), as sensed by the pick-off transducer, and generate a drive command signal to the force amplifier that will restore and maintain the proof-mass at it's centered (zero displacement) location. When the Proof-Mass is stabilized in the zero steady state position, the acceleration acting on the Proof-Mass due to the force amplifier exactly balances the specific acceleration acting on the system and is therefore a good estimate of the input acceleration.

Figure 2:
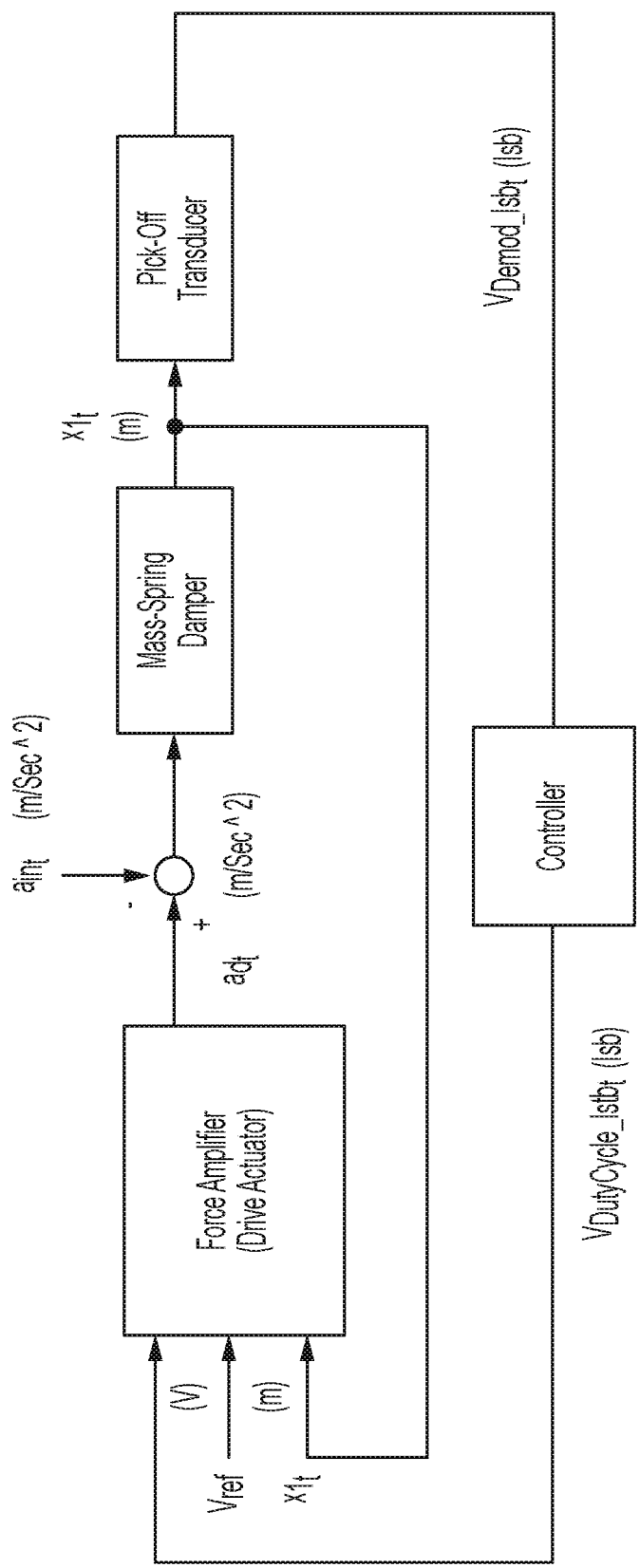
FIG. 2 is a block diagram of the MEMS accelerometer system shown in FIG. 1.
Figure 3:
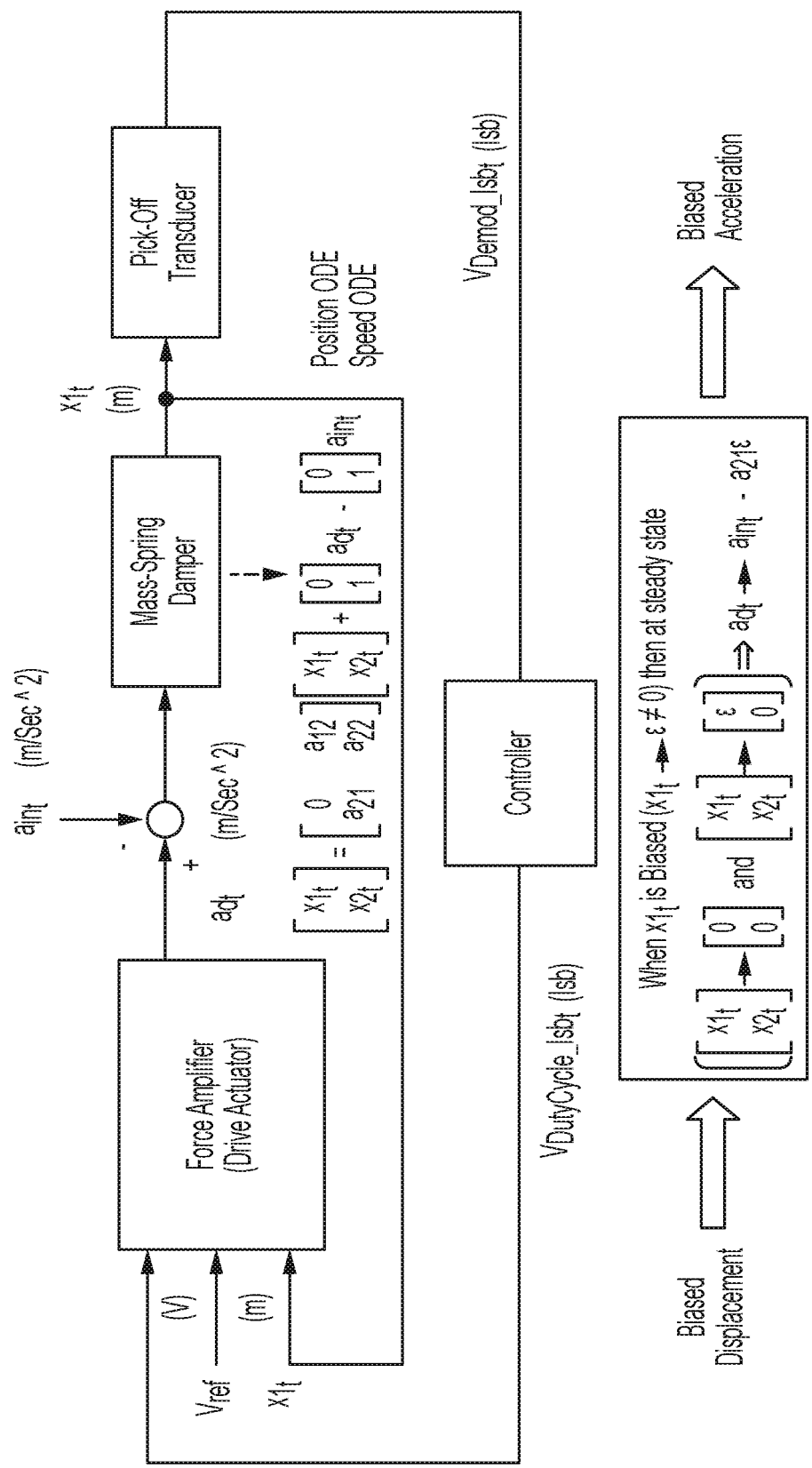
FIG. 3 is a schematic diagram of the accelerometer controller system of FIG. 2 while experiencing a biased acceleration problem that can cause biased displacement results in biased acceleration estimates.

For purposes of explanation and illustration, and not limitation, an illustrative view of a MEMS accelerometer system 100 in accordance with the disclosure is shown in FIGS. 1-3. The MEMS accelerometer system 100 can be implemented in various types of avionic systems or aircrafts. Referring to FIGS. 1-3, the MEMS accelerometer system 100 can include a proof-mass device 101 having a proof-mass 101*a* configured to move from an initial position in response to an input acceleration. The proof-mass device 101 can be an interdigitated capacitance arrangement (e.g., having metallic interdigitated members, a portion of which are connected to the proof-mass 101*a* to move relative to another portion of digits).

The system 100 can include a transducer 103 (e.g., a pick-off transducer) operatively connected to the proof-mass device 101 to output a transducer signal correlating to a movement and/or position of the proof-mass 101*a*. The transducer signal can be an indication of capacitance, and thus, can be correlated to position of the proof-mass, for example.

The system 100 can include a driver 105 (e.g., a drive force transducer) operatively connected to the proof-mass device 101 and configured to drive the proof-mass. The driver 105 can be configured to electro mechanically drive the proof-mass back toward the initial position, for example.

The system 100 can include a controller 111 operatively connected to the driver 105 to control the driver 105. The controller 111 can be operatively connected to the transducer 103 to receive the transducer signal and output a drive signal to the driver 105 to drive the proof-mass 101*a* toward an initial position.

In accordance with at least one aspect of this disclosure, an avionics system can include a MEMS accelerometer system. The MEMS accelerometer system can be any suitable accelerometer system disclosed herein, e.g., system 100 as described above. In certain sensor systems such as a MEMS, a proof-mass may need to be driven back into an original position or the device may no longer function because the proof-mass will hit a stop. In certain systems, the controller calculates where the mass is, then calculates energy needed to push mass back electromechanically to its zero/initial position. The controller output can be a better read of acceleration as the transducer output can include noise, etc. There are both transients, then there is bias in the steady state in traditional system.

The general architecture of a single axis very high precision (VHP) MEMS-A accelerometer capacitance device is shown in FIG. 1. For the system of FIG. 1, external applied input acceleration displaces the Proof-Mass and varies the distant of the formed capacitors plates and hence the overall capacitance. The above capacitance variation is transduced to an electrical voltage by a displacement transducer (Pick-Off) which is then used by a control system in order to excite the Drive Force Transducer to apply an appropriate electrical Force (i.e., and acceleration) and balance the Proof-Mass into a desired zero position.

In the portion of the system as shown in FIG. 2, the input acceleration signal that is to be sensed can be estimated by the controller's output when the system rests in steady state. The controller can be designed to operate on the displacement of the Proof-Mass (Mass-Spring Damper System), as sensed by the Pick-Off Transducer, and generate a drive command signal to the Force Amplifier that will restore and maintain the Proof-Mass at its centered (zero displacement) location. When the Proof-Mass is stabilized in the zero steady state position, the acceleration acting on the Proof-Mass due to the Force Amplifier exactly balances the specific acceleration acting on the system and is therefore a good estimate of the input acceleration. However, it should be noted that when the Proof-Mass is not stabilized in the zero steady state position, the controller's output is not a good estimate of the input acceleration, and an error in the estimate of the acceleration is created as illustrated in FIG. 3, which shows the bias acceleration problem. In addition, in cases/applications where significant temperature variations are developed, the MEMS formed capacitor plates material can deform, and, hence the overall capacitance can change which results in an additional temperature attributed bias errors in the estimated acceleration. The traditional MEMS controllers are agnostic to such temperature effects and incapable of resolving temperature related bias acceleration estimation errors.

Thus, the type of control scheme as shown in FIG. 3 can be referred to as the legacy system, and such the legacy controller is not an optimal observer of the input acceleration. In fact, the input acceleration to the observer enters the system as a disturbance, and so the actual goal of the accelerometer device is to observe the disturbance of the system. In addition, traditional controller solutions only satisfy the observation goal when in steady state, and in fact the controller loop gain designs must conform to the usual trade-offs between performance response of the Proof-Mass and disturbance rejection.

In addition, the traditional architecture of the legacy controller is not designed to account for endogenous system uncertainty (parameter variations with temperature, system nonlinearities) and high frequency noise. Furthermore, the traditional legacy controller solution only satisfies the observation goal when in steady state, and in fact the controller loop gain designs must conform to the usual trade-offs between performance response of the Proof-Mass and disturbance rejection.

Various non-limiting embodiments of the present disclosure overcome the shortcomings of the traditional controller solutions described above by providing a MEMS accelerometer system that implements a robust controller (RC) configured to achieves design specifications in the frequency domain and mitigates bias to improve the operation of MEMS accelerometer devices toward tactical grade and beyond. The RC can be implemented either in hardware via analogue electronics and/or an embedded software-controlled device, and can be described and implemented in closed analytical form with deterministic mathematical equations.

In addition, one or more non-limiting embodiments of the present disclosure replaces the traditional legacy controller with the RC, which is configured to operate according to a closed-loop Proof-Mass feedback control. The RC operates without a robust observer, but yet can achieve excellent system design specifications with lower system complexity than the prior art cited above. In addition, the RC design according to various non-limiting embodiments of the present disclosure offers the flexibility of a reducing the model order and complexity, thereby allowing the controller to implement the algorithms in the same hardware/firmware footprint of currently available MEMS system.

In addition, one or more non-limiting embodiments provides an RC designed according to a systematic standard architecture which is well-defined, computer automated, and repeatable so that the design and system implementation are compliant with standard system verification and certification processes. According to a non-limiting embodiment, the gains of the RC are designed optimally under a rigorous Loop-Shaping framework in the frequency domain which automatically address MEMS accelerometer dynamic, steady state response and noise rejection specifications. The control signals are further capable of compensating for endogenous bias caused by MEMS Proof-mass material deformations due to temperature variations. In this manner, the RC described according to one or more non-limiting embodiments herein can more accurately track and provide estimates of the input acceleration acting on the system, thereby reducing the estimation bias during transient motion of the proof-mass, and improving rejection of system noise.

Figure 4:
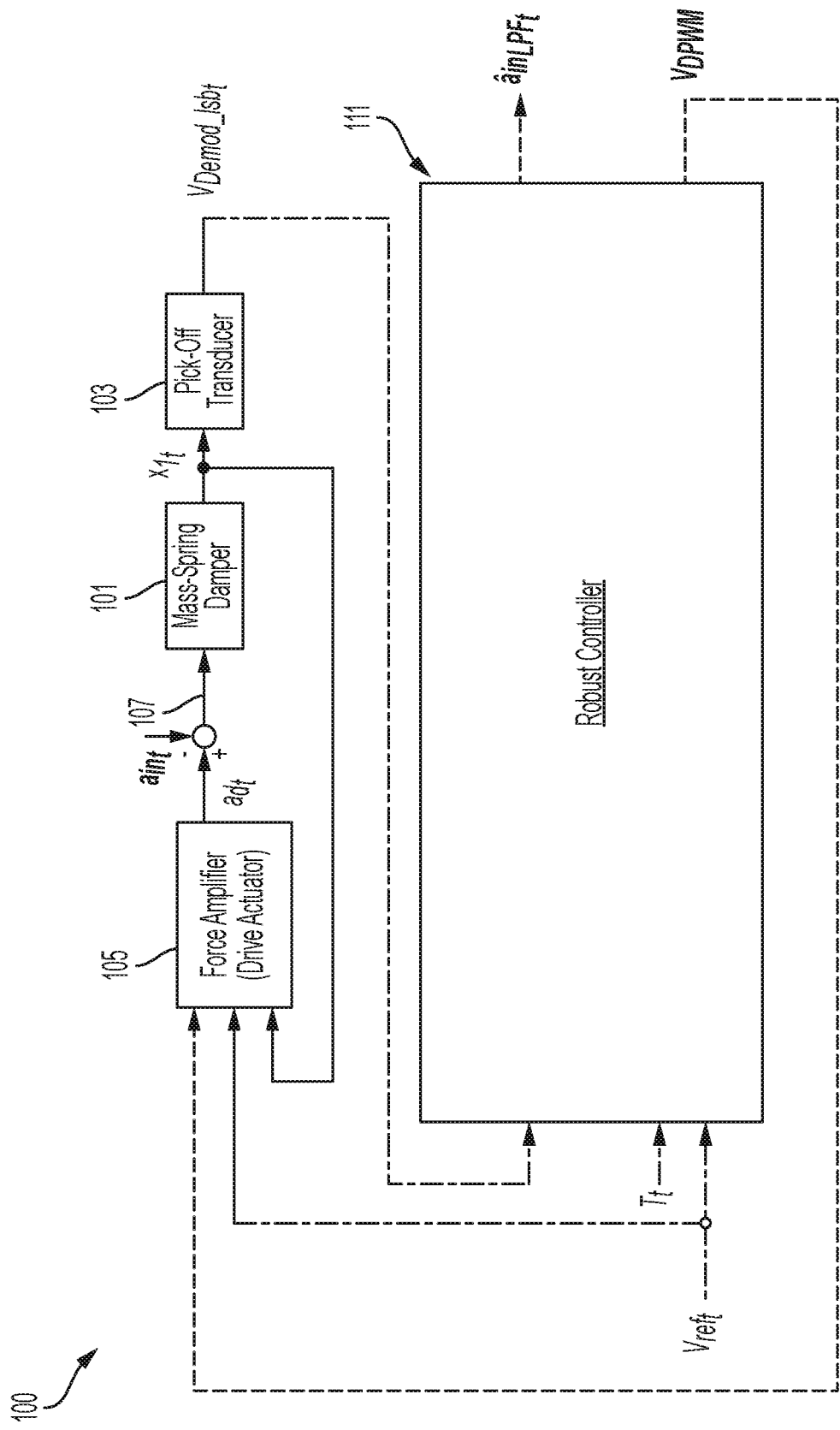
FIG. 4 is a schematic diagram of the system of FIG. 1 implementing a robust controller (RC) according to a non-limiting embodiment of the present disclosure.

With reference now to FIG. 4, a MEMS accelerometer system 100 is illustrated according to a non-limiting embodiment of the present disclosure. As described herein, the MEMS accelerator system 100 can be implemented in various types of avionics systems or aircrafts. The MEMS accelerometer system 100 includes a proof-mass device 101, a driver 105 (e.g., a drive force transducer), a transducer 103, and a robust controller (RC) 111.

The proof-mass device 101 has a proof-mass configured to move from an initial position in response to an input acceleration. For example, the avionics systems or aircraft can realize an acceleration (i.e., an input acceleration), which in turn is applied to the proof-mass device 101. The proof-mass device 101 can be an interdigitated capacitance arrangement (e.g., having metallic interdigitated members, a portion of which are connected to the proof-mass to move relative to another portion of digits).

The driver 105 is operatively connected to the proof-mass device 101 and is configured to drive the proof-mass 101. According to a non-limiting embodiment, the driver 105 outputs a signal (adt), which is applied to an external acceleration (aint) to generate a drive signal 107 that is configured to electro mechanically drive the proof-mass 101 back toward the initial position, for example.

The transducer 103 (e.g., a pick-off transducer) is operatively connected to the proof-mass device 101 to output a transducer signal correlating to a movement and/or position of the proof-mass. The transducer signal can be an indication of capacitance, and thus, can be correlated to position of the proof-mass, for example.

Figure 5:
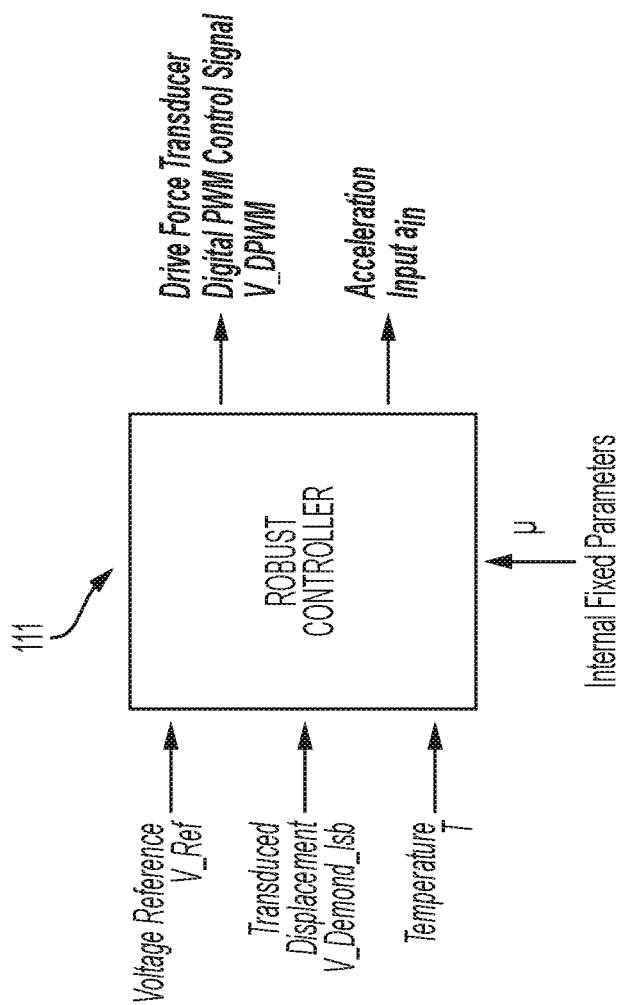
FIG. 5 is a schematic functional diagram of the embodiment of the robust controller of the system of FIG. 4 according to a non-limiting embodiment of the present disclosure.

The RC 111 is an active dynamic component to the MEMS accelerometer system 100 in the sense that it actuates the driver 105 (e.g., drive force transducer). According to one or more non-limiting embodiments, the RC 111 is in signal communication with the transducer 103 (e.g., pick-off transducer) and the driver 105 (e.g., force amplifier drive actuator) to establish closed-loop proof-mass feedback control. With continued reference to FIG. 4, along with FIG. 5, the RC 111 receives as inputs: 1) the transduced displacement (VDemod_lsb) from the pick-off transducer 103, 2) the temperature signal (Tt) (e.g., from a MEMS-A available temperature sensor), and 3) the voltage reference of transducers (Vref). The RC 111 outputs: 1) the unfiltered digital PWM signal (VDPW_M), which is driving the driver 105 (e.g., drive force transducer) and 2) an estimate of the acceleration input (âinLPFt). As further illustrated in FIG. 5, the controller is programmed with internal fixed controller parameters. These controller parameters (μ) include, but are not limited to, gain parameters of the RC controller (i.e. parameters of numerator and denominator of the controllers transfer function K(s), and F-gains in the LPF transfer function equations.

Figure 6:
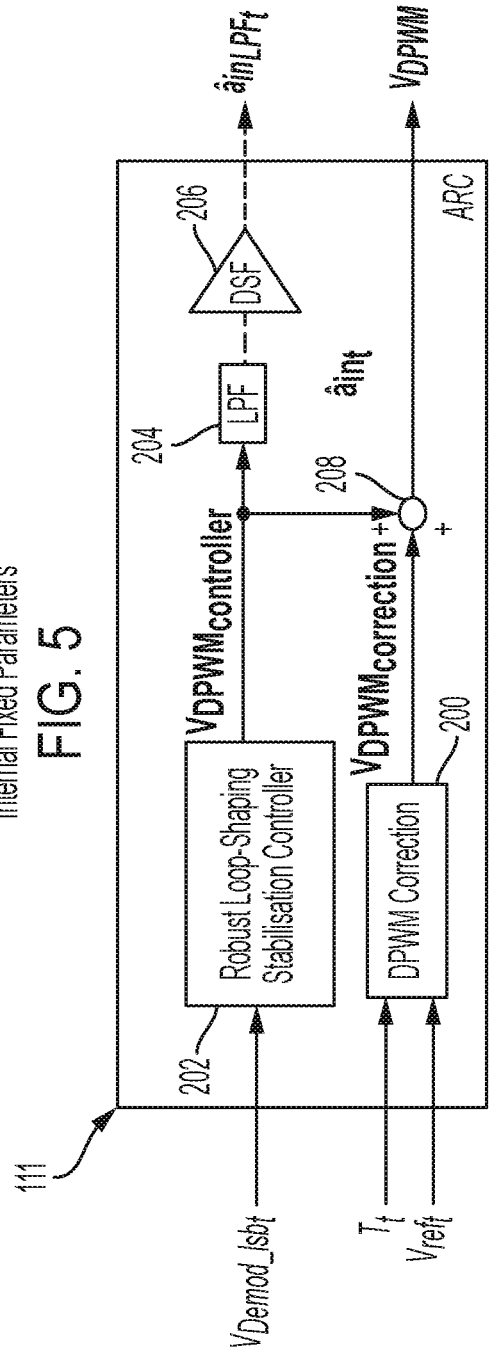
FIG. 6 is a schematic diagram depicting the architecture of the robust controller shown in FIG. 5 according to a non-limiting embodiment of the present disclosure.

Turning now to FIG. 6, an RC 111 included in the MEMS accelerometer system 100 is illustrated according to a non-limiting embodiment. The RC 111 includes a robust loop-shaping stabilization module 202, a digital pulse-width modulation (DPWM) correction module 200, a low-pass filter (LPF) 204, a digital scale factor (DSF) module 206, and a summer 208. Any one of the robust loop-shaping stabilization module 202, the DPWM correction module 200, the LPF 204, and the DSF module 206 can be implemented as an individual controller or processor.

The DPWM correction module 200 receives as inputs the temperature signal (T) and the transducer voltage reference (Vref). According to a non-limiting embodiment, the DPWM correction module 200 utilizes one or more bias acceleration thermal models, derived offline for the particular device, along with one or more models of the driver 105, the transducer 103 and/or the proof-mass 101. According to a non-limiting embodiments, models of the driver 105, transducer 103 and/or the proof-mass 101 can include non-linear mathematical models of the electronic firmware and/or software that assemble the transducers and second order mechanical motion dynamical models for the proof-mass mechanical equation. Based on the above information at a given temperature indicated by the input temperature (T), the DPWM correction module 200 computes a real-time estimate of the small gap displacement in the Proof-Mass 101. Accordingly, the DPWM correction signal (VDPW_M_CORRECTION) is actively adjusted to compensate for drifts attributed to the above small gap variation due to temperature variations. In one or more non-limiting embodiments, the DPWM correction module 200 can be implemented in code for online application.

According to a non-limiting embodiment, the DPWM correction module 200 can utilize a mathematical formula or model representing the nonlinear model of the transducer 103 (e.g., drive force transducer) and a mathematical formula or model of the Proof-Mass 101 to compute the small gap displacement and the temperature measurement capable. Based on the small gap displacement, the DPWM module 200 can perform the required DPWM correction.

The robust loop-shaping stabilization module 202 receives as an input the transduced displacement (VDemod_lsb), and based thereon generates a nominal digital PWM voltage signal of the controller (VDPW_M_CONTROLLER), which can serve as an estimate of the input acceleration. The robust loop-shaping stabilization module 202 can be designed offline and in the continuous frequency domain using various Laplace transfer function of the open loop system from the unfiltered DPWM input to the driver (e.g., drive force transducer) to the transduced displacement voltage (VDemod_lsb) output from the pick-off transducer 103. According to a non-limiting embodiment, the resulting design of the robust loop-shaping stabilization module 202 is a Laplace transfer function, which can be implemented in online code as a discrete time state space system.

The LPF 204 is in signal communication with the robust loop-shaping stabilization module 202 to receive as an input the nominal digital PWM voltage signal (VDPW_M_CONTROLLER). The LPF 204 operates to eliminate undesired high order harmonic content and noise from the acceleration estimate signal (VDPW_M_CONTROLLER). According to a non-limiting embodiment, the LPF 204 is implemented as a 6th-order nonlinear low-pass filter. For example, According to a non-limiting embodiment, the LPF 204 can include two 2nd order Butterworth low-pass filters and a 2nd order nonlinear exponential low-pass lifter filter connected in series. The design parameter in continuous time domain is the filter cut-off frequencies in the Butterworth filters and the exponential rate parameter in the nonlinear filter above. The continuous Butterworth filter design can be implemented in code directly as an equivalent sampled data (digital) state space of the following z-transfer functions:

$$y_{fB}(z) = \frac{F_{n_{10}} + F_{n_{11}}z^{-1} + F_{n_{12}}z^{-2}}{1 + F_{d_{11}}z^{-1} + F_{d_{12}}z^{-2}} x_a(z)$$

$$x_{a_{fB}}(z) = \frac{F_{n_{20}} + F_{n_{21}}z^{-1} + F_{n_{22}}z^{-2}}{1 + F_{d_{21}}z^{-1} + F_{d_{22}}z^{-2}} y_{fB}(z)$$

The nonlinear exponential filter is implemented in code directly as the following nonlinear iterative equations:

$$w(kt_s) = Lw(kt_s - 1) + 1$$

$$x_{a_f}(kt_s + 1) = (1 - w^{-1}(kt_s))x_{a_f}(kt_s) + w^{-1}(kt_s)x_{a_{fB}}(kt_s)$$

Accordingly, the LPF 204 is designed offline and the values of the above filters' coefficients are set in the online code. According to a non-limiting embodiment, the design parameter L above, is a tuning parameter, set to values between 0 and 1, with which the design can trade between steady state noise attenuation and speed of dynamic transient response.

The DSF 206 is in signal communication with the LPF 204 and applies a gain to the filtered digital PWM voltage signal (VDPW_M_CONTROLLER). According to a non-limiting embodiment, the gain multiplies the filtered digital PWM voltage signal (VDPW_M_CONTROLLER) to accurately scale the final estimate of the input acceleration. Accordingly, the error between the final estimate of the input acceleration and the actual input acceleration applied to the proof-mass can be reduced. In one or more non-limiting embodiments, the gain is a fixed value selected for a specific device or application.

The summer 208 combines the DPWM correction signal (VDPW_M_CORRECTION) output from the DPWM correction module 200 with the nominal digital PWM voltage signal of the controller (VDPW_M_CONTROLLER) output from the robust loop-shaping stabilization module 202 to generate the digital PWM voltage signal (VDPW_M). Accordingly, the VDPW_M signal includes a correction which incorporates an adaptive component to the RC architecture that compensates for variations in temperature. In this manner, the RC 111 can actively adjust the VDPW_M signal based on the Tt, Vref, and the controller (VDPW_M_CONTROLLER) to actively correct the VDPW_M signal, which is then utilized as a feedback signal that can actively drive the driver 105.

According to a non-limiting embodiment, the robust loop-shaping stabilization module 202 can be designed offline according the robust stabilization method, and can utilize an open-loop Laplace transfer function (G(s)) which is based on the unfiltered DPWM input signal that is delivered to the driver 105 to drive the transducer 103 and generate the output Demod lsb signal. Accordingly, the robust loop-shaping stabilization module 202 can employ a pre-filter having a transfer function W1(s) and a post-filter having a transfer function W2(s), if necessary, so that the new shaped MEMS-A transfer function Gs(s)=W2(s)G(s)W1(s) satisfies a desired frequency response shape defined by system requirements (e.g., based on desired Bode, Nichols and/or Nyquist plots). The designed closed-loop system can be simulated (e.g., with sampled data) (e.g., using a discrete controller), based on nonlinear validated simulation models. If the tested closed-loop system is not satisfactory, the pre-filter (W1(s)) and the post-filter (W2(s)) can be adjusted, and the closed-loop system re-tested until the desired results are achieved. If required, the order (e.g., trade-off optimality vs complexity) of the designed controller (e.g., the robust loop-shaping stabilization module 202) can be reduced using a state-of-the-art rigorous model order reduction method such as, for example, a balance truncation method.

In one or more non-limiting embodiments, a robust stabilization method can be employed, which takes into account effects of unknown additive system dynamics and uncertainty (e.g. modelling uncertainty and/or additional dynamics) that can potentially reduce the stability margins of the closed-loop system. A design objective can include maximizing the Allowed Coprime Plant Uncertainty Margin (ACPUM) under which the system preserves its stability. In order to achieve the above optimization, the shaped open loop transfer function is factored as the coprime factorization: $G_s(s)=M(s)^{-1}N(s)$, in which uncertainty is mathematically expressed using the following equation:

$$G_P(s) = \{(M(s) + \Delta_M(s))^{-1}(N(s) + \Delta_N(s)): \|[\Delta_M(s) \; \Delta_N(s)]\|_\infty < \varepsilon\}.$$

Accordingly, Gp(s) can be viewed as Gs(s)+Uncertain/Unknown Dynamics, and the term $[\Delta M(s) \; \Delta N(s)]|\infty$ can be considered as an upper bound of the maximum of the magnitude values, referred to as [ΔM(s) ΔN(s)] in the Laplace frequency domain.

With respect to the above robust stabilization method, the controller design can be set to a desired upper bound for ACPUM=ε, and the controller is determined as Ks(s) to obtain the following expression:

$$\|[\Delta_M(s) \; \Delta_N(s)]\|_\infty < \frac{1}{\gamma} = \varepsilon$$

In one or more non-limited embodiments, the above process and design can be facilitated using a programming language and numeric computing environment such as, for example, MATLAB, where W1(s), W2(s), and γr>1, which implements a suboptimal controller that satisfies a relatively reduced ACPUM by a factor of γr. For γr=1, the optimal controller can be implemented. Tuning γr>1 may assist in practical implemented to reduce the controller gains without sacrificing the closed loop frequency response requirements and achieving adequate time response performance.

Figure 7:
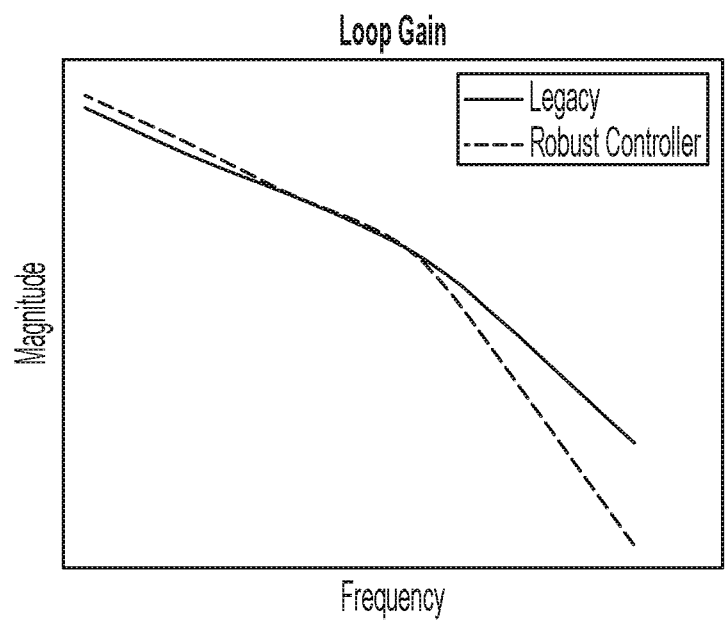
FIG. 7 is a diagram illustrating depicting frequency response shaping for the MEMS accelerometer system implementing the robust controller shown in FIG. 5 according to a non-limiting embodiment of the present disclosure.
Figure 8:
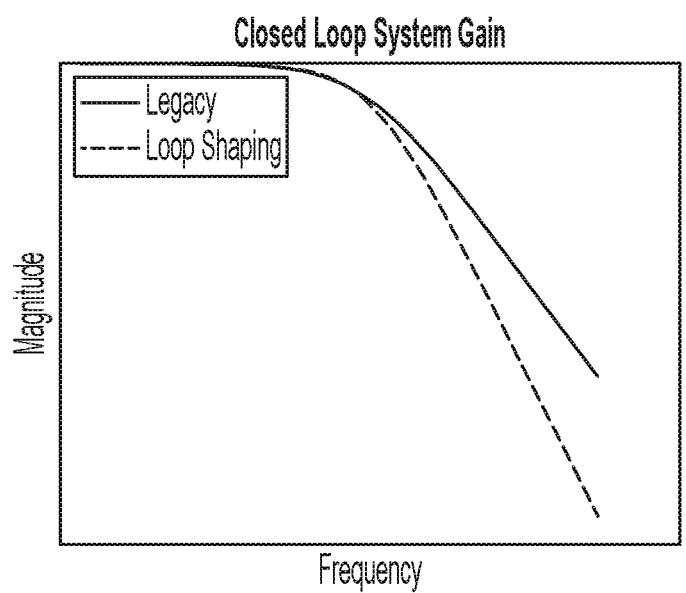
FIG. 8 is a diagram illustrating depicting frequency response shaping for the MEMS accelerometer system implementing the robust controller shown in FIG. 5 after applying a closed-loop control according to a non-limiting embodiment of the present disclosure.

FIGS. 7 and 8 are graphs depicting the frequency response shaping of a MEMS accelerometer system 100 following the design process described above according to a non-limiting embodiment of the present disclosure.

As shown in FIG. 7, the Loop-Gain of the legacy controller is reshaped so that the MEMS accelerometer system 100 can satisfy a systems frequency response requirements and design specifications, namely: have better amplification in low frequencies spectrum, better attenuation in the high frequencies and preserve the same bandwidth (cut-off frequency point).

Consequently, based on the desired Loop Gain in FIG. 7, the closed-loop control system of the MEMS accelerometer will possess the frequency response shown in FIG. 8, where it is shown that the system retains the design frequency characteristics in FIG. 7 in under closed-loop control action, under which acceleration estimation is feasible and operational stability is guaranteed.

FIGS. 9-13D show the simulated performance of the Robust Controller (RC) compared to the performance of a Legacy design MEMS accelerometer. In these figures the data has been normalized to show relative improvements of the RC with respect to a legacy design while avoiding any revelations of technical data either actual or predicted.

Figure 9:
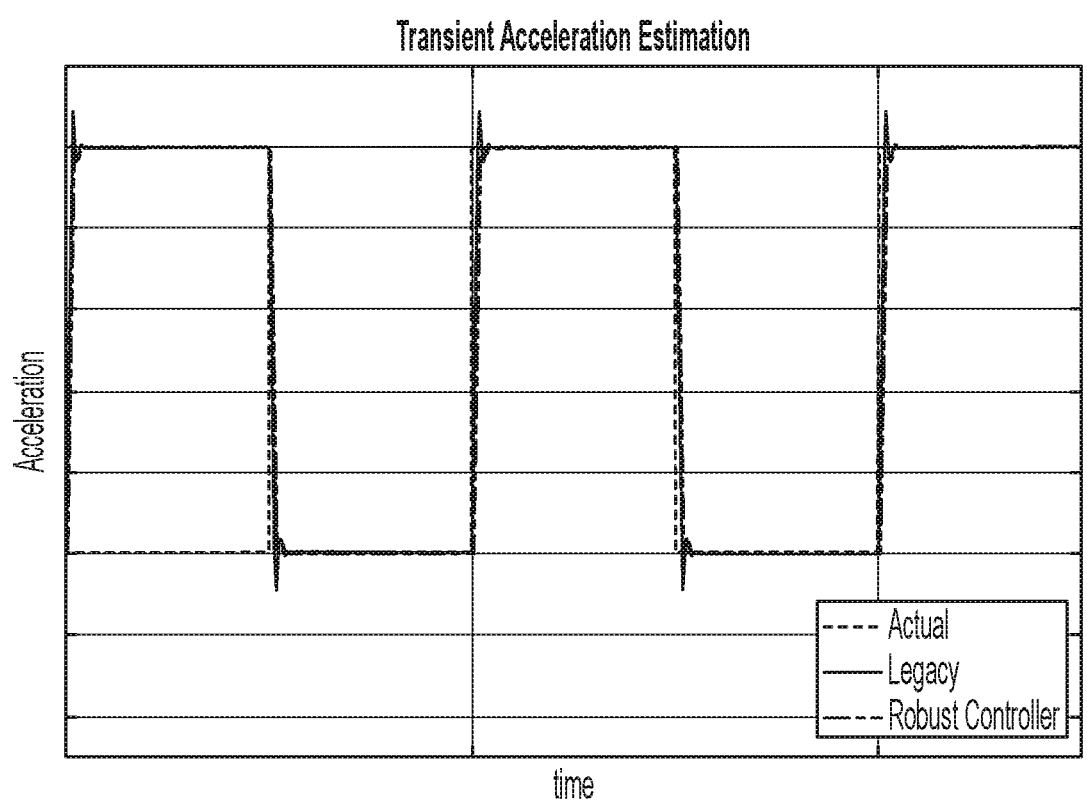
FIG. 9 is a diagram comparing a transient acceleration response of a RC in a legacy system to the transient acceleration response of the MEMS accelerometer system implementing the robust controller shown in FIG. 5 according to a non-limiting embodiment of the present disclosure.
Figure 10A:
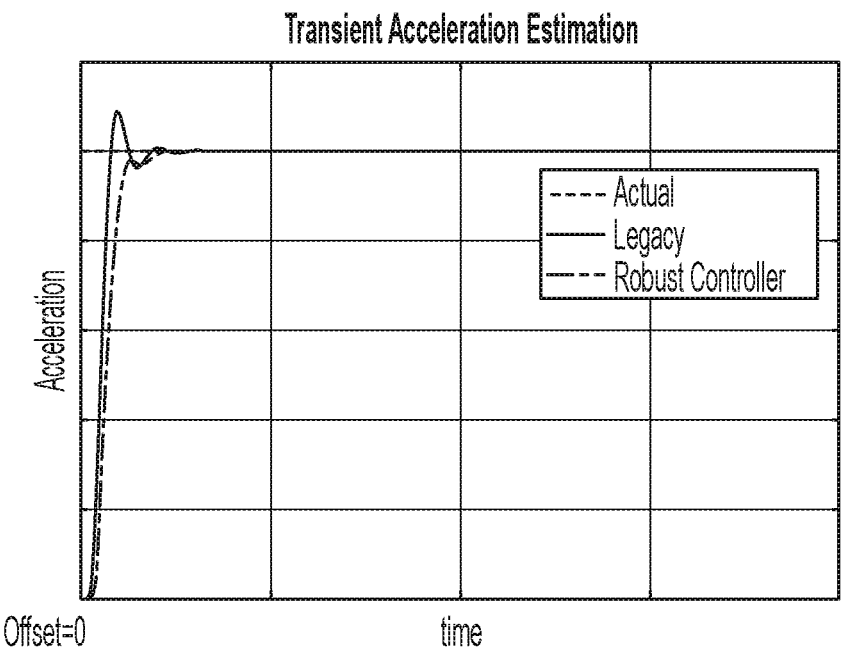
FIGS. 10A, 10B, 10C, and 10D show four charts of comparison for acceleration estimation response assuming no bias and no noise.
Figure 10B:
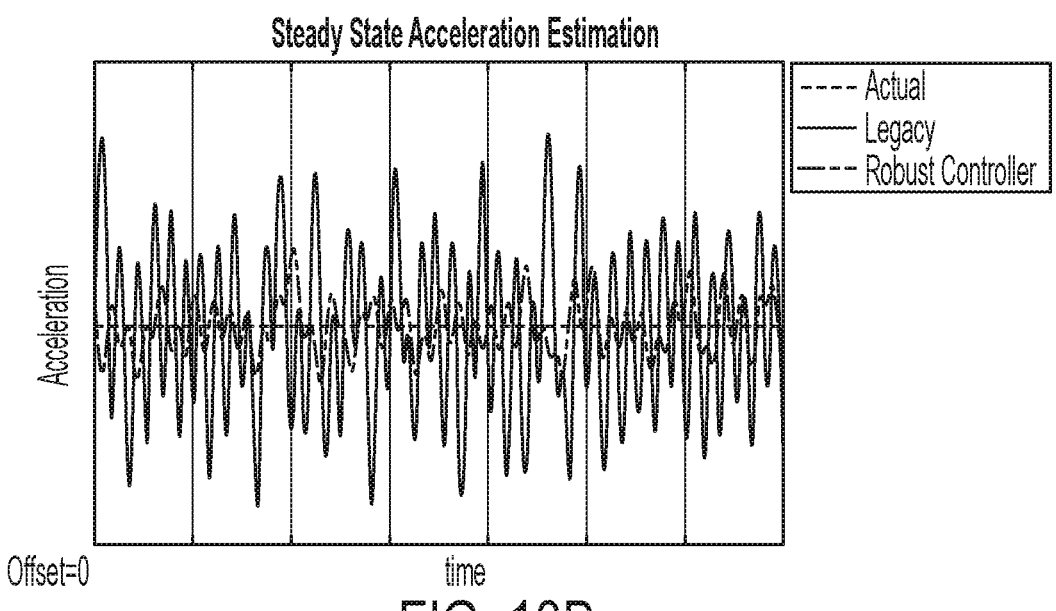
Figure 10C:
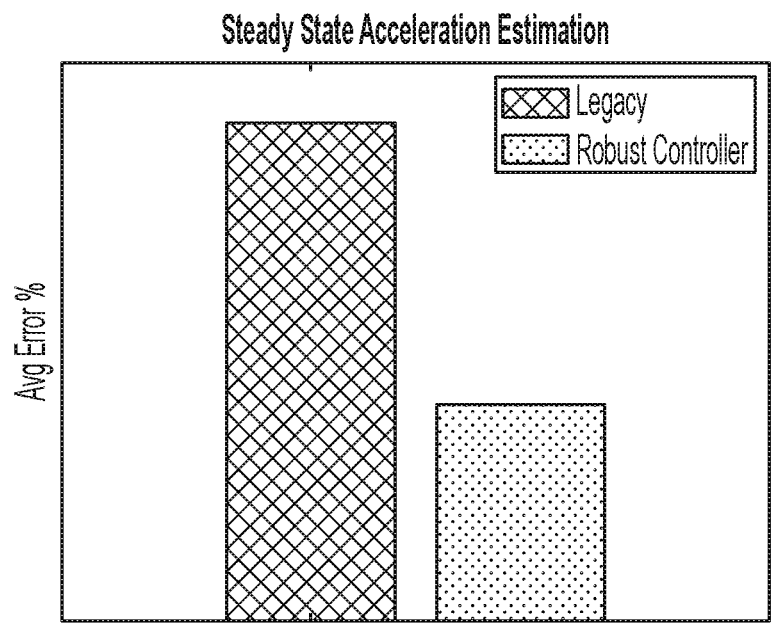
Figure 10D:
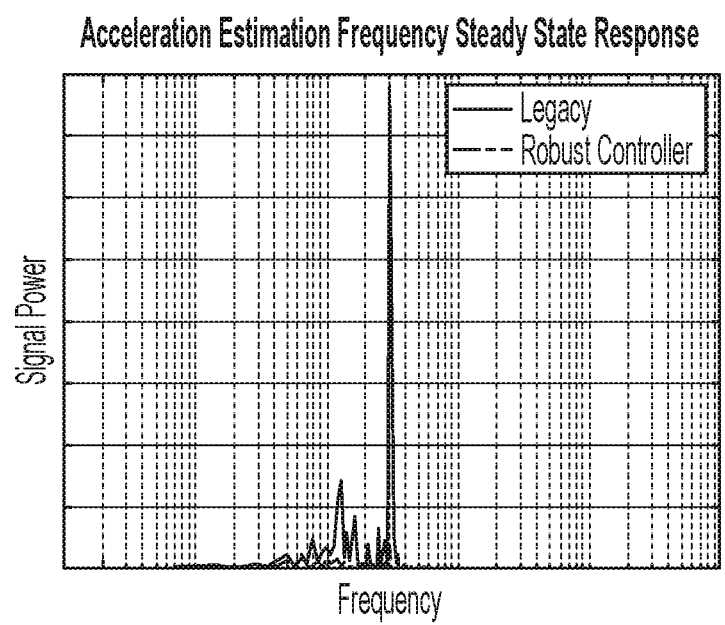

Referring to FIG. 9, comparisons of RC to a legacy controller for acceleration estimation response with no noise and no temperature bias is illustrated. The estimates are affected by the delays inherent in the reading of the pick-off transducer, but the RC estimate is more accurate with minimal overshoot and reaches steady state in about same time as the Legacy design.

For the demonstrations shown below in FIGS. 9-13D, the RC was tuned to satisfy both dynamic speed response and noise reduction in the MEMS accelerometer. In addition, as demonstrated in FIGS. 13A, 13B, 13C and 13D, the RC was re-tuned to provide increased noise rejection with some minimal reduction in response time. A major advantage of the architecture is that the RC LPF can be tuned via the single parameter L to achieve desired output performance bandwidth vs disturbance rejection specifications for the MEMS accelerometer. In addition, the order of the controller has been further reduced to illustrate options in the design where minimum complexity system is desirable to the expense of minor reduction in dynamic transient response of the system.

Referring to FIGS. 10A-10D, the transient and steady state responses of the acceleration estimates are compared to a constant acceleration input with no noise and no temperature bias. Both estimates are affected by the delays inherent in the reading of the pick-off transducer, but the RC estimate is more accurate with no overshoot. In addition, the average steady state error of RC is much smaller than that of the Legacy's. In steady state the RC clearly results in lower amplitude oscillations across the entire frequency spectrum. This RC capability is as well verified by the frequency response power spectrum, shown in FIGS. 10A-10D, where evidently the RC significantly mitigates steady state oscillations in steady state over legacy system.

Figure 11A:
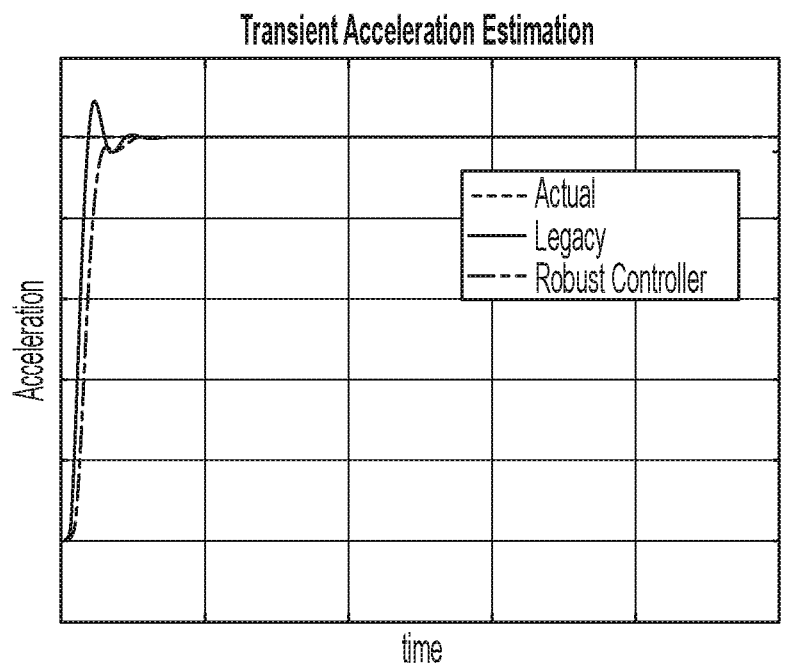
FIGS. 11A, 11B, 11C, 11D, 11E, and 11F show six charts of comparison for acceleration estimation response assuming bias due to thermal variation and nonlinear electronic random noise.
Figure 11B:
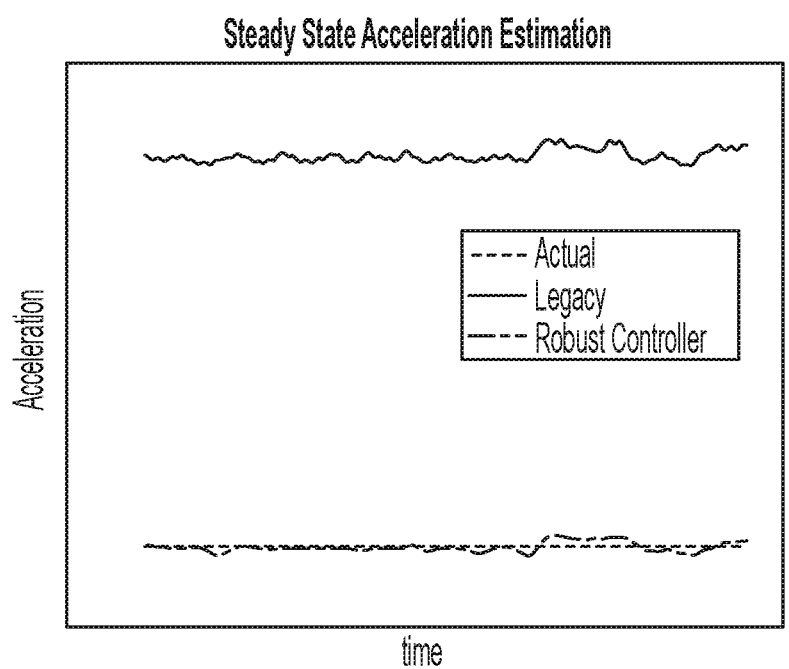
Figure 11C:
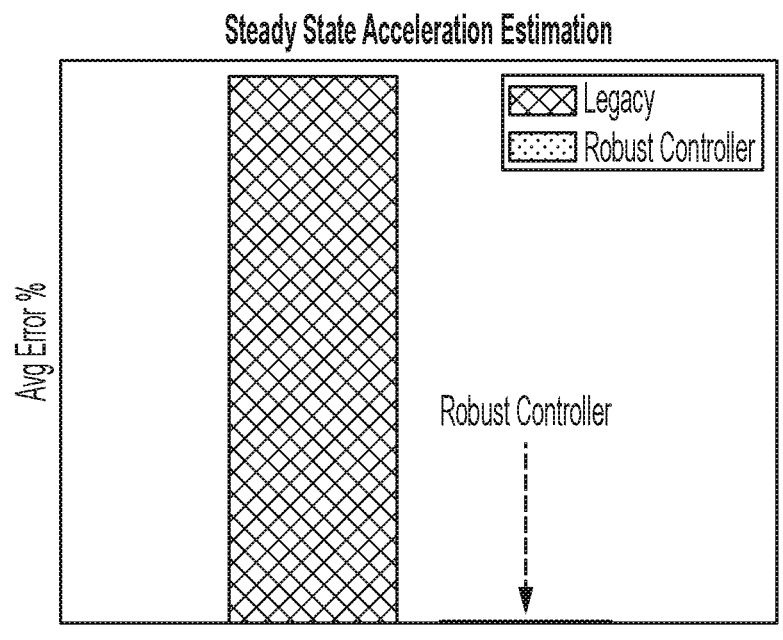
Figure 11D:
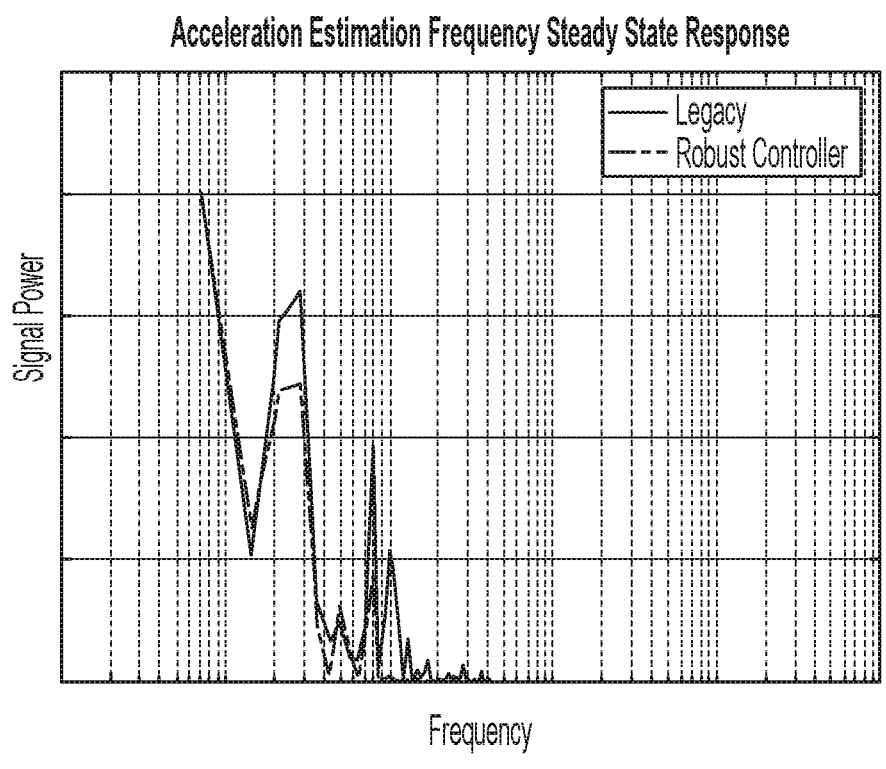
Figure 11E:
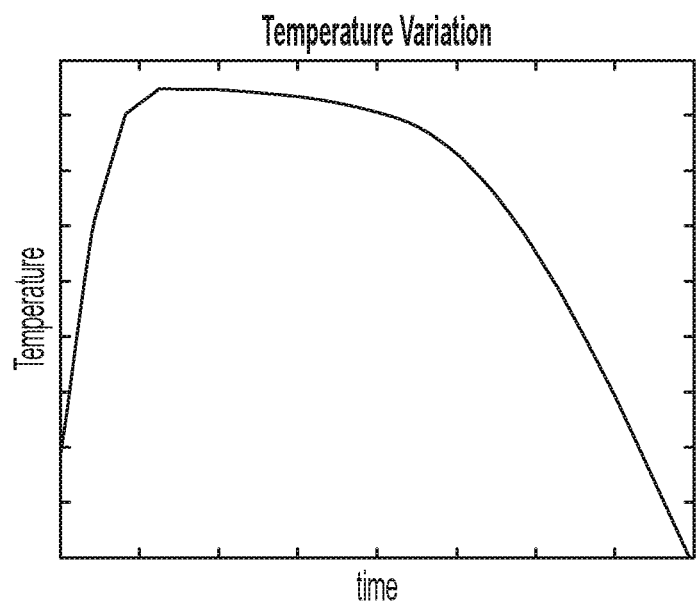
Figure 11F:
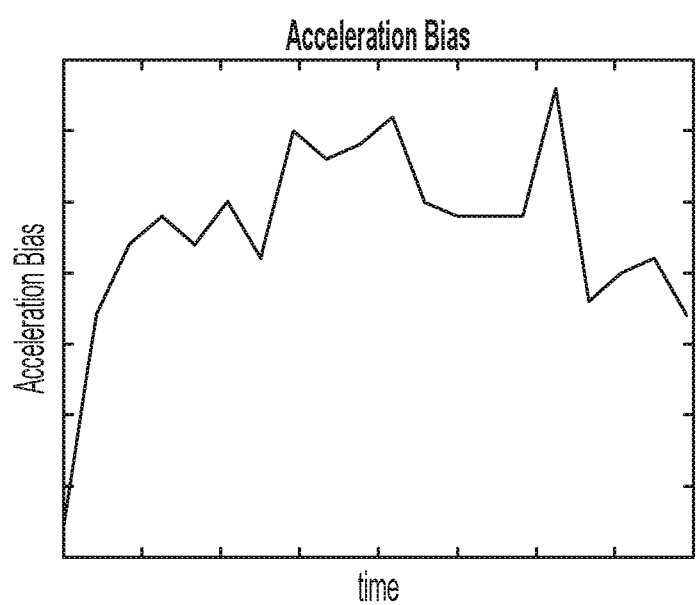
Figure 12A:
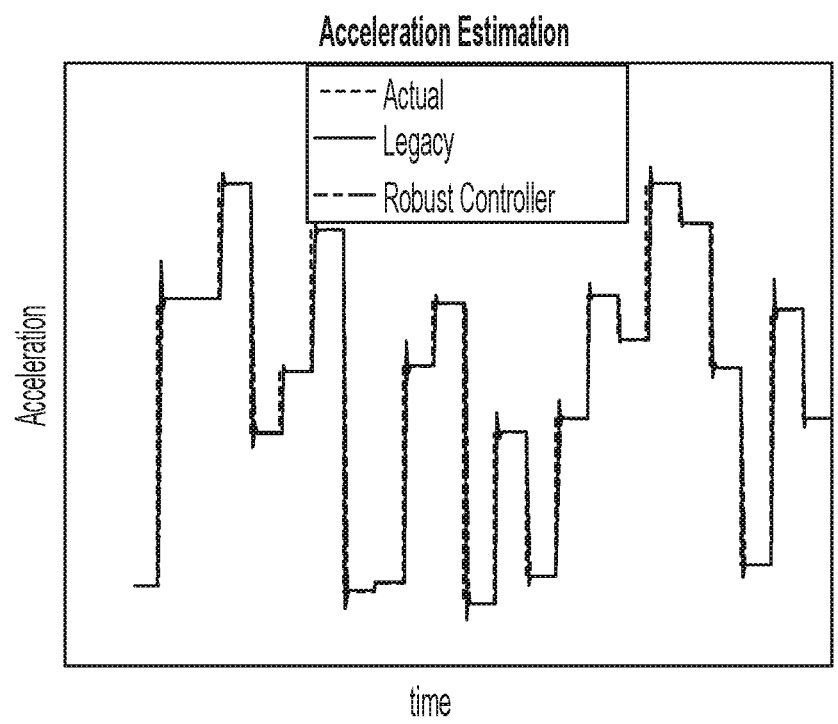
FIGS. 12A, 12B, 12C, and 12D show four charts of comparison for the acceleration estimation response at multiple system operational envelops and system thermal condition.
Figure 12B:
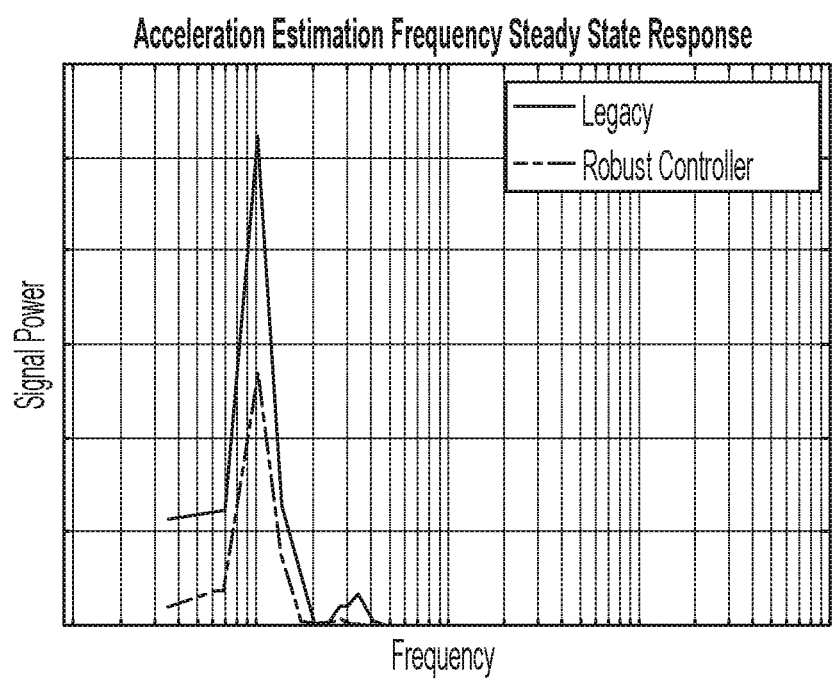
Figure 12C:
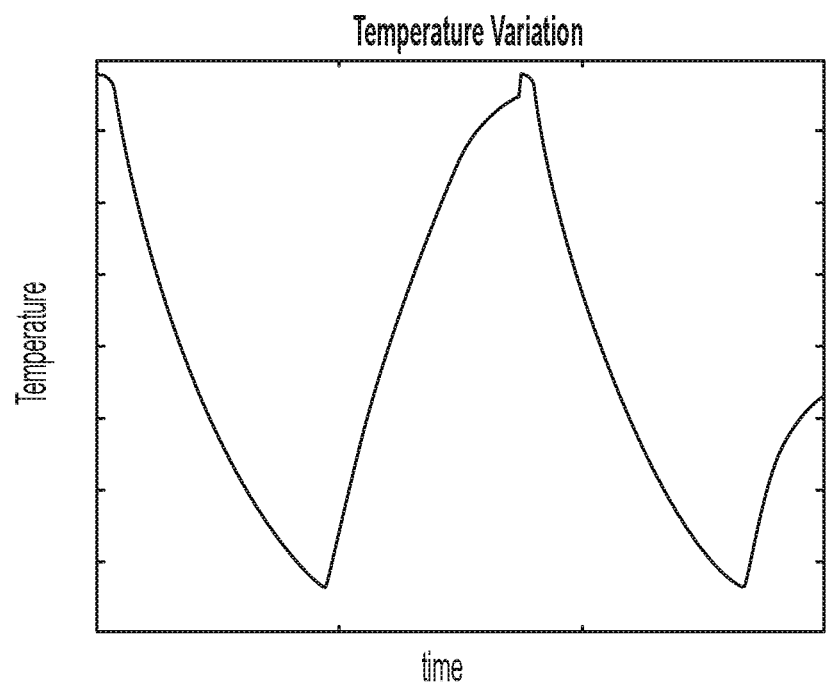
Figure 12D:
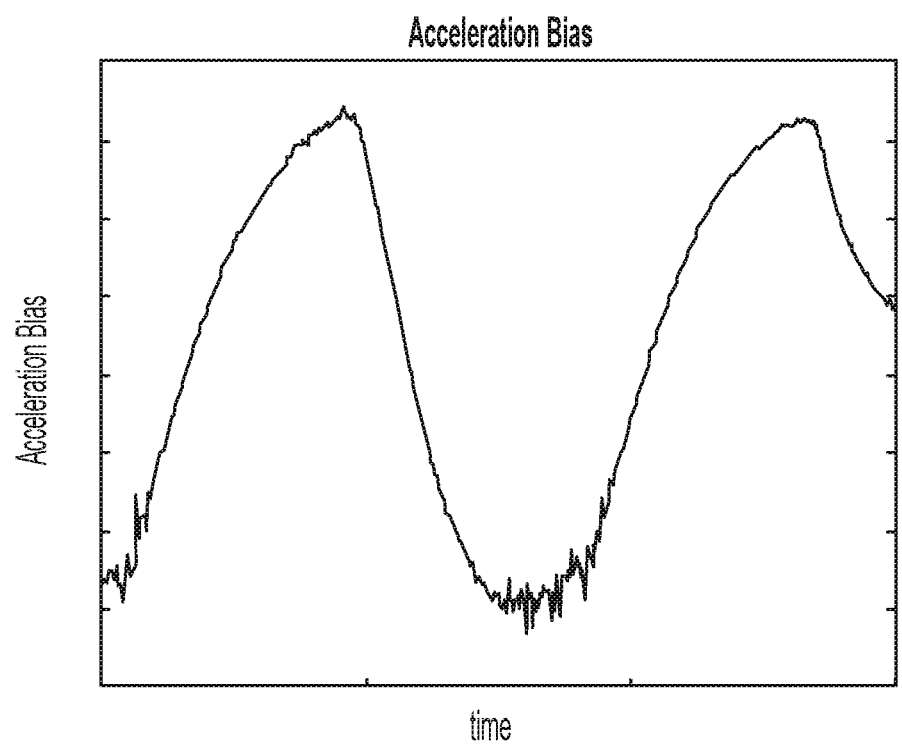
Figure 13A:
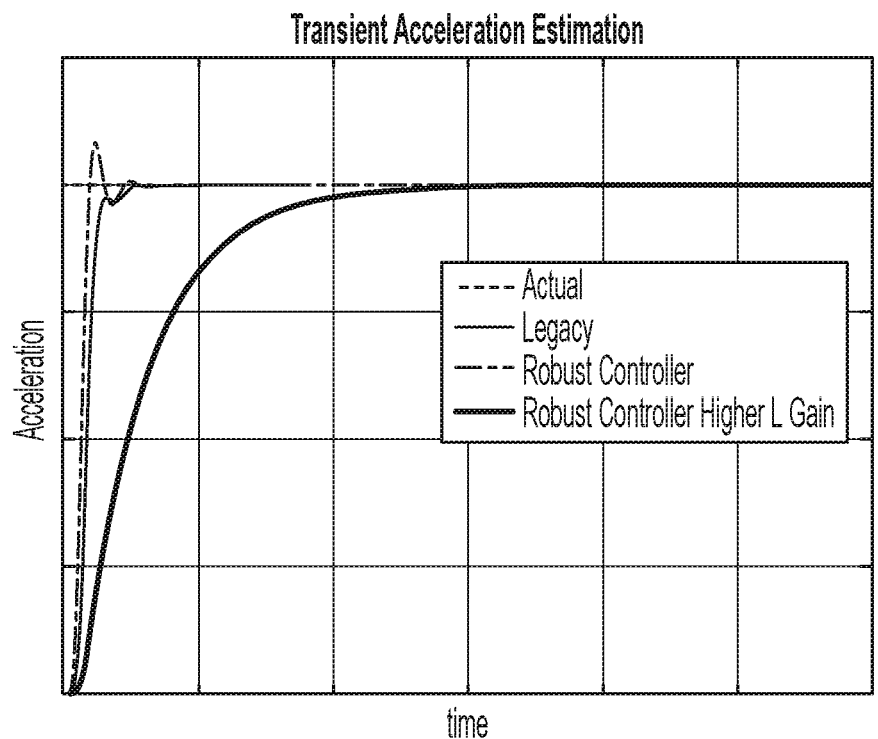
FIGS. 13A, 13B, 13C, and 13D illustrate four charts of comparison, showing the response of the acceleration to a constant acceleration input, under the presence of electronic noise and delays inherent in the reading of the pick-off transducer.
Figure 13B:
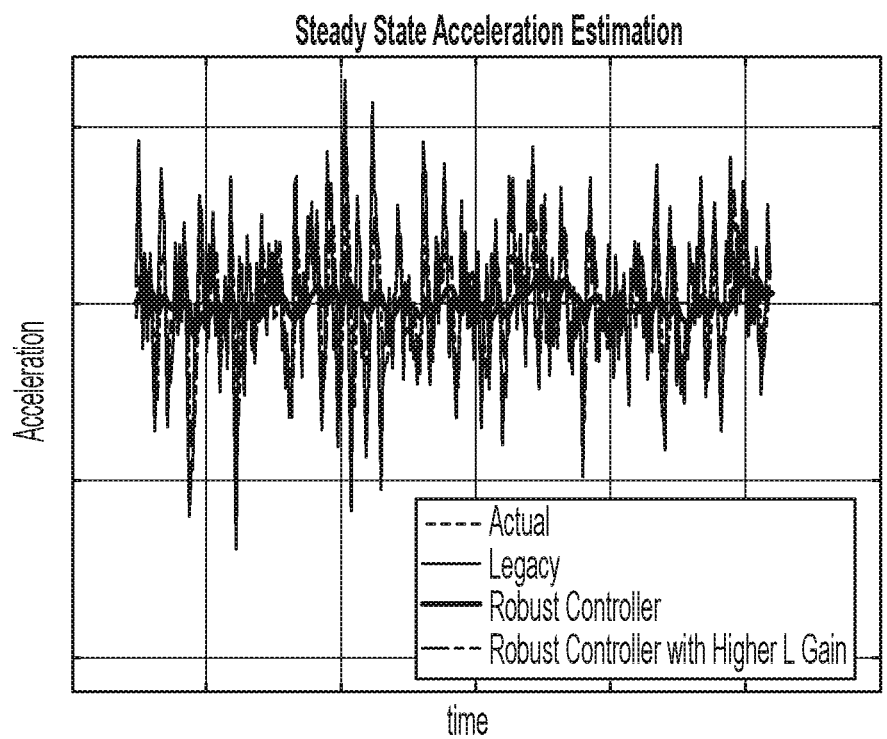
Figure 13C:
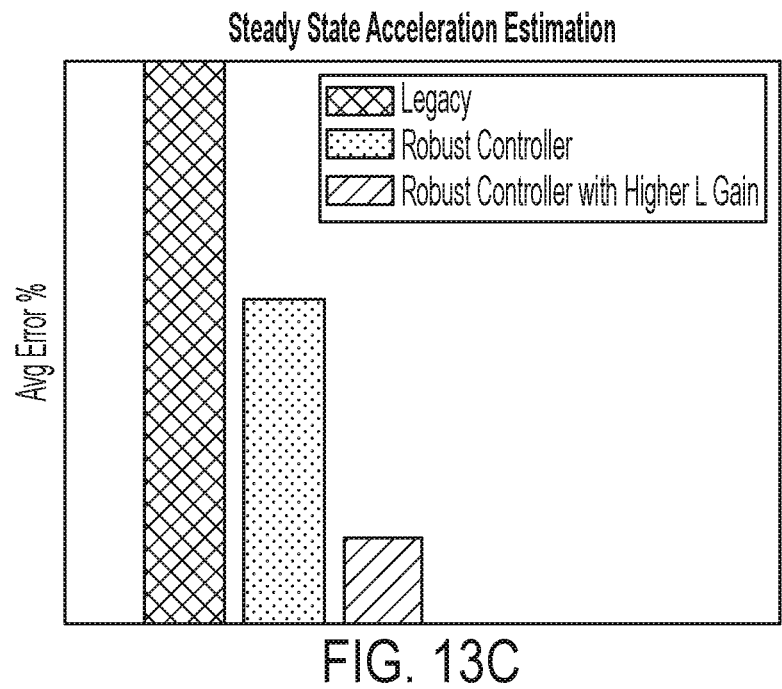
Figure 13D:
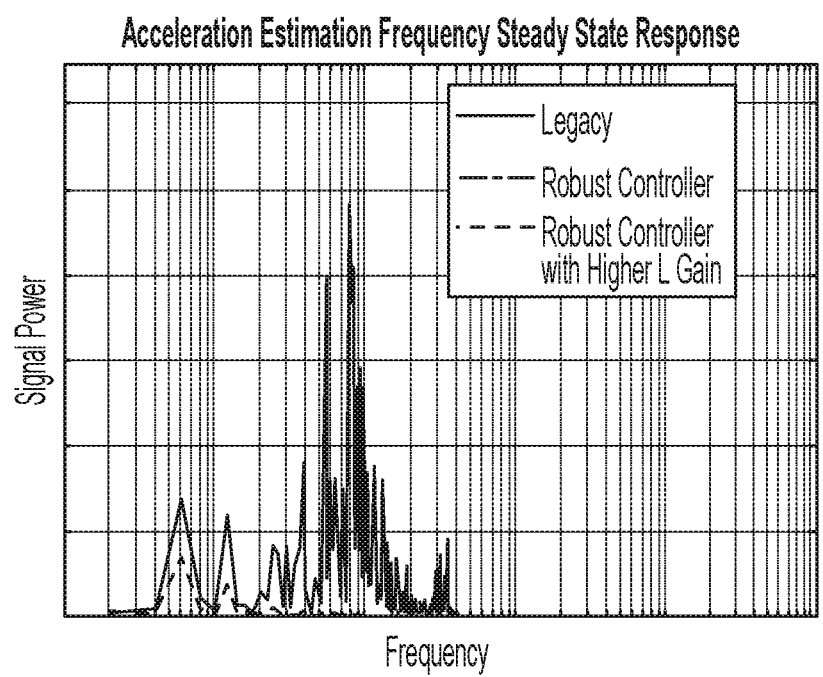

FIGS. 11A-11D show the transient and steady state responses of the accelerator estimates to a constant acceleration input as previously, but under the presence of acceleration bias due to temperature variations as shown in the last row of plots in FIGS. 11E-11F. In addition, the presence of nonlinear random hardware electronic noise in the op-amp output of the Pick-Off transducer is considered. This noise adds uncertainty at ±20% of the nominal OP-AMP output. As before, both estimates are affected by the delays inherent in the reading of the pick-off transducer. The transient response is similar to the no noise, no bias cases where the RC estimate is more accurate and with no overshoot in comparison to the Legacy design. Regarding the steady state oscillations, which in this case are affected as well by electronic noise, they are better mitigated by the RC as it is shown by the power spectrum graph. The noticeable improvement is the mitigation of acceleration bias as shown in the steady state time plot, where clearly the RC resulting minimal estimation error in contrast with the Legacy controller resulting a biased acceleration estimate. This is attributed to the RC feature of being gnostic of temperature bias models and therefore being able to model-base adapt to temperature variations over time.

FIGS. 12A-12F show the response of the acceleration estimates to a series of multiple changing acceleration input levels, under the presence of electronic noise and delays inherent in the reading of the pick-off transducer. In addition, thermal variation and bias is present to the system as shown in the last row of graphs in FIGS. 12A-12F. The transient response in this case is like all previous cases where the RC estimate is more accurate and with minimal overshoot in comparison to the Legacy design. Regarding the steady state oscillations, which in this case are affected as well by electronic noise, they are better mitigated by the RC as it is shown by the power spectrum graph in steady state. The noticeable improvement in this test case is the deterioration of the Legacy system performance because of very large overshoots (spikes) occurring at several changes in the acceleration levels as shown in FIGS. 12A-12F. The RC design however compensates for such oscillations and preserves its dynamical characteristics over variable operational envelopes and regimes. In addition, the RC results minimum estimation error in contrast with Legacy which results in a biased acceleration estimate as in previous cases.

FIGS. 13A-13D show the response of the acceleration to a constant acceleration input, under the presence of electronic noise and delays inherent in the reading of the pick-off transducer. No thermal variation and bias are considered in this test as the intent here is to demonstrate design flexibility for trading steady-state accuracy vs dynamic speed response and thus capability of boosting the device's accuracy according to different specification grades.

FIGS. 13A-13D show the Legacy, a nominal design of RC as in the previous presented cases and a retuned RC design, where the RC parameter L is increased by 7% from its nominal setup. From the plots in FIGS. 13A-13D it is apparent that steady state oscillations and noise can be further mitigated to result substantially smaller steady state errors, but to the expense of a slower but non-oscillatory transient system response. Obviously as it is illustrated herein, the proposed invention offers the capability of transforming the same MEMS device to different grade specifications, e.g., the same device can operate as very high performance (VHP) optimized for either speed or response or accuracy of steady state.

Figure 14:
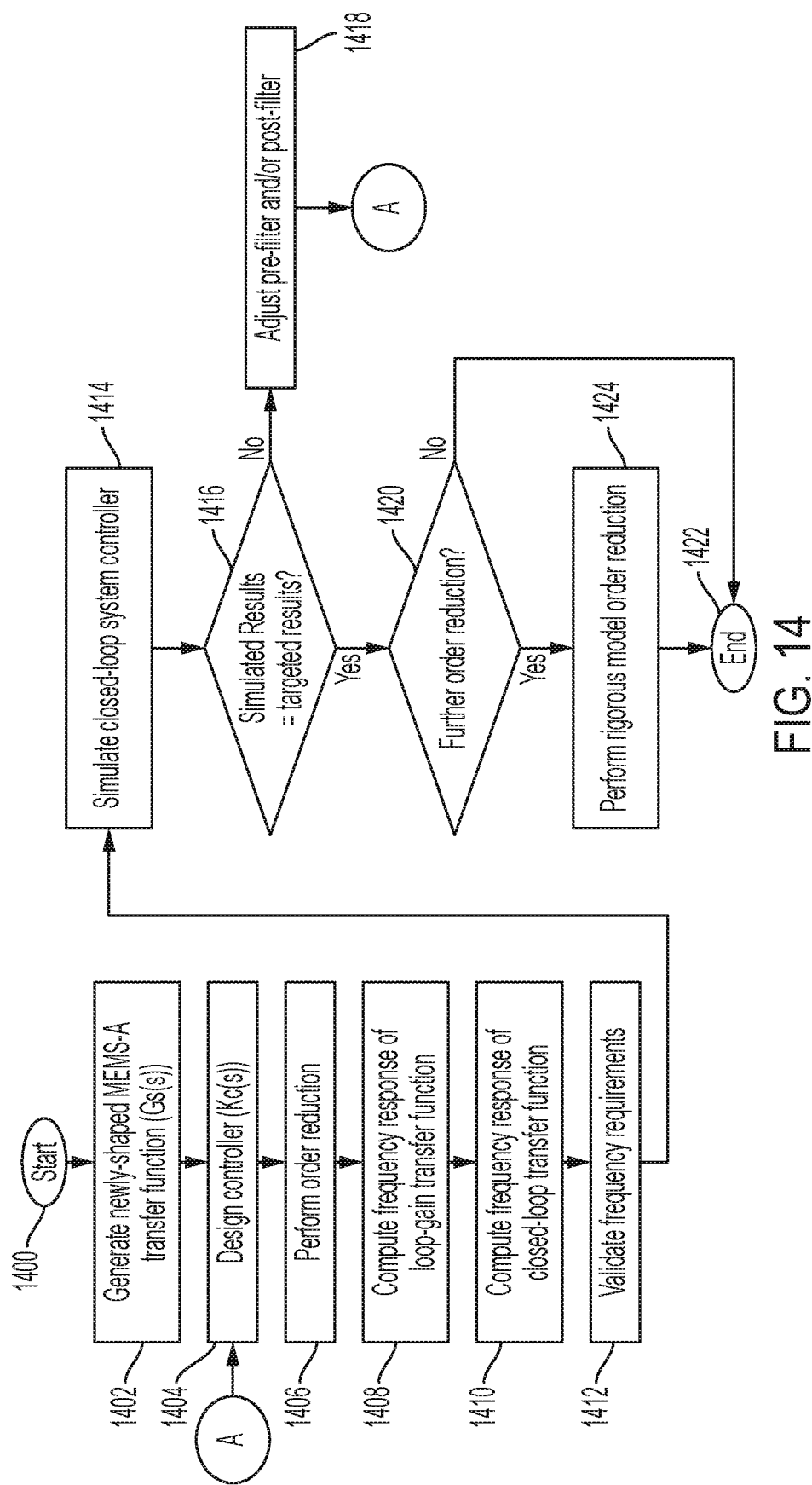
FIG. 14 is a flow diagram illustrating a method of designing a robust loop-shaping stabilization module according to a non-limiting embodiment of the present disclosure.

Referring now to FIG. 14, a flow diagram illustrates a method of designing a robust loop-shaping stabilization module 202 according to a non-limiting embodiment of the present disclosure. The method begins at operation 1400, and at operation 1402, a newly-shaped MEMS-A transfer function (Gs(s)) is generated. Generating the newly-shaped MEMS-A transfer function (Gs(s)) can include a pre-filter having a pre-filter transfer function (W1($s$)) and a post-filter having a post-filter transfer function (W2($s$)). At operation 1404, a controller (Kc(s)) is designed that is expressed as: Kc(s)=W1($s$)Ks(s)W2($s$), where Ks(s) is a controller design based on the newly-shaped transfer function Gs(s). In one or more non-limiting embodiments, a robust stabilization method is used to design a controller Ks(s). At operation 1406, an order reduction can be optionally performed on the designed controller (Kc(s)) to produce a low-complexity controller. At operation 1408, a frequency response of the loop-gain transfer function GLG(s)=G(s)(Kc(s) is determined, and at operation 1410 a frequency response of the closed-loop transfer function $$GCL(s) = \frac{GLG(s)}{1 + GLG(s)}$$

is determined. At operation 1412, the frequency requirements of the robust loop-shaping stabilization module 202 are validated. At operation 1414, the closed-loop system implementing the discrete (e.g., sampled data) controller is simulated on non-linear validated simulation models. At operation 1416, a determination is made as to whether the simulation results satisfy (e.g., equal or substantially equal) targeted results. When the simulated results do not satisfy the targeted results, the pre-filter (W1($s$)) and/or the post-filter (W2($s$)) are adjusted at operation 1418, and the method returns to operation 1402 to update the design of the controller (Kc($s$)).

When, however, the simulated results satisfy the targeted results at operation 1416, the method can determine whether a further order reduction of the designed controller (Kc($s$)) is necessary at operation 1420. When a further order reduction is not required, the method ends at operation 1422. When further order reduction is required, however, the method proceeds to operation 1424, a rigorous model order reduction operation is applied to the designed controller (Kc($s$)), and the method ends at operation 1422.

As described herein, various non-limiting embodiments of the present disclosure provides a MEMS accelerometer system, which implements a robust controller that improves the estimation of specific acceleration acting upon the Proof-Mass device. In one or more non-limiting embodiments, the RC facilitates the improvement of dynamic (transient) system performance over legacy products, with mitigated oscillations in steady state over legacy system. The RC also increases the robustness to real time variations in system operational envelops and system thermal conditions, while also reducing bias errors due to temperature variation and improving noise attenuation in the MEMS accelerometer system. The RC also allows for flexibility to tune the same device for operation at different MEMS accelerometer specification grades.

In one or more non-limiting embodiments, the RC facilitates an active MEMS accelerometer system rather than a traditional passive observer-based system by actively actuating a driver (e.g., drive force transducer) to actively control the MEMS proof-mass position.

According to a non-limiting embodiment, the RC replaces legacy controllers in a traditional MEMS Accelerometer Systems and can operate without a robust observer while still achieving improved system design specifications with lower system complexity.

According to a non-limiting, the RC implements a novel mixed differential-algebraic deterministic architecture which includes linear and nonlinear components capable of processing real-time input signals from the proof-mass position transduced voltage signal and the MEMS-A temperature sensor signal. Accordingly, the RC can generate the actuation signal for the drive force transducer to balance (control) the proof-mass position.

According to a non-limiting embodiment, the RC implements a novel nonlinear output filter architecture component, which can be utilized to output a measurement for the current acceleration of the device.

According to a non-limiting embodiment, the RC can be implemented in hardware electronics or as a system embedded software code and can designed to function at different fixed sampling rates.

According to a non-limiting embodiment, the RC minimizes bias errors attributed to MEMS-A proof-mass material geometric deformations due to thermal variations and helps achieve VHP performance towards tactical ranges accuracy.

According to a non-limiting embodiment, the RC substantially minimizes system redundant oscillations at steady state performance further over Legacy and robust observers;

According to a non-limiting embodiment, the RC minimizes the impact of general system model uncertainty and (i.e., of any stochastic) and signal noise (i.e., of any stochastic);

According to a non-limiting embodiment, the RC enables design flexibility with tradeoffs of complexity vs dynamic system speed response to keep the dynamical system states order minimal.

According to a non-limiting embodiment, the RC enables tunable flexibility to set the same device at different MEMS accelerometer grades specifications.

According to a non-limiting embodiment, the RC is implementable using the same hardware/firmware IMU parts of prior Legacy systems.

According to a non-limiting embodiment, the RC is robust to various MEMS-A operating (acceleration patterns and amplitudes) and environmental conditions (temperature variations).

According to a non-limiting embodiment, the RC implements a systematic design standard work which is well-defined, computer automated, and repeatable so that the design and system implementation are compliant with standard system verification and certification processes.

According to a non-limiting embodiment, the RC performs a specific per MEMS-A device calibration process for tuning appropriately the mathematical models and algorithm of the controller.

Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a Field Programmable Gate Array (FPGA), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++, HDL, VHDL or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A Micro-Electrical-Mechanical-Systems (MEMS) accelerometer system, comprising:
a proof-mass device having a proof-mass configured to move from an initial position in response to an input acceleration;
a transducer operatively connected to the proof-mass device to output a transducer signal correlating to one or both of a movement and position of the proof-mass;
a driver operatively connected to the proof-mass device and configured to drive the proof-mass;
a controller in signal communication with the transducer to receive the transducer signal and in signal communication with the driver to actively control the driver to actively drive the proof-mass toward the initial position,
wherein the controller actively adjusts a drive signal based on a temperature signal (T) indicative of a given temperature, a transducer voltage signal (Vref) indicative of a transducer voltage reference, and the transducer signal to actively generate a corrected drive signal and delivers the corrected drive signal to the driver to actively control the driver.

2. The system of claim 1, wherein the controller utilizes a robust loop-shaping stabilization operation to produce both an unfiltered estimate of the input acceleration and an uncorrected drive signal to stabilize the proof mass.

3. The system of claim 2, wherein the controller processes the unfiltered estimate of the input acceleration with a low pass filter (LPF) and a digital scale factor (DSF) to provide additional noise reduction and scaling to output an estimated acceleration of the input acceleration.

4. The system of claim 3, wherein the controller is configured to deterministically estimate the input acceleration based on the transducer signal, and is configured to output an estimated input acceleration signal indicative of the estimated the input acceleration.

5. The system of claim 4, wherein the controller determines the estimated input acceleration without implementing a passive observer.

6. The system of claim 4, wherein the controller comprises:
a robust loop-shaping stabilization module configured receive the transducer signal, and based thereon to generate a nominal digital PWM voltage signal indicative of a non-filtered estimation of the input acceleration; and
a digital pulse-width modulation (DPWM) correction module configured to receive the temperature signal and the transducer voltage reference, and based thereon to generate a DPWM correction signal indicative of a real-time estimate of a small gap displacement in the proof-mass,
wherein the controller generates the corrected drive signal based on the nominal digital PWM voltage signal and the DPWM correction signal.

7. The system of claim 6, wherein the controller combines the nominal digital PWM voltage signal with the DPWM correction signal to generate the corrected drive signal.

8. The system of claim 7, wherein the digital pulse-width modulation (DPWM) correction module includes a bias acceleration thermal model and a driver model of the driver, and inputs the given temperature and the transducer voltage reference to the bias acceleration thermal model and the driver model so as to generate the DPWM correction signal.

9. The system of claim 7, wherein the controller further comprises:
a low-pass filter in signal communication with the robust loop-shaping stabilization module, the low-pass filter configured to filter noise from the nominal digital PWM voltage signal to generate a filtered digital PWM voltage signal and produce the additional noise filtering; and
a digital scale factor (DSF) module in signal communication with the low-pass filter, the DSF module configured to apply a gain to the filtered digital PWM voltage signal so as to generate the estimated input acceleration signal.

10. The system of claim 9, wherein the gain multiplies the filtered digital PWM voltage signal to produce the scaling which scales the estimated input acceleration signal so as to reduce an error between the filtered digital PWM voltage signal and the input acceleration.

11. A method of estimating acceleration realized by a Micro-Electrical-Mechanical-Systems (MEMS) accelerometer system, the method comprising:
applying an acceleration to a proof-mass device having a proof-mass;
moving the proof-mass device from an initial position in response to the acceleration;
outputting, from a transducer operatively connected to the proof-mass device, a transducer signal which correlates to one or both of a movement and a position of the proof-mass;
driving the prof-mass using a driver operatively connected to the proof-mass device;
delivering the transducer signal to a controller and actively controlling, by the controller; the driver to actively drive the proof-mass toward the initial position based at least in part on the transducer signal;
actively adjusting, by the controller, a drive signal based on a temperature signal (T) indicative of a given temperature, a transducer voltage signal (Vref) indicative of a transducer voltage reference, and the transducer signal;
actively generating a corrected drive signal in response to adjusting the drive signal; and
delivering the corrected drive signal to the driver to actively control the driver.

12. The method of claim 11, further comprising utilizing, by the controller, a robust loop-shaping stabilization operation to produce both an unfiltered estimate of the acceleration and an uncorrected drive signal to stabilize the proof mass.

13. The method of claim 12, further comprising processing, by the controller, the estimate of the acceleration with a low pass filter (LPF) and a digital scale factor (DSF) to provide additional noise reduction and scaling to output an estimated acceleration estimate of the acceleration.

14. The method of claim 12, further comprising determining, by the controller, the estimated acceleration without implementing a passive observer.

15. The method of claim 14, wherein generating the DPWM correction signal further comprises:
delivering the given temperature and the transducer voltage reference to the digital pulse-DPWM correction module;
applying, by the DPWM correction module, a temperature value indicated by the temperature signal to a bias acceleration thermal model;
applying, by the DPWM correction module, the transducer voltage reference to a driver model; and generating the DPWM correction signal based on outputs from the bias acceleration thermal model and the driver model.

16. The method of claim 14, wherein outputting the estimated acceleration further includes:
    filtering noise from the nominal digital PWM voltage signal to generate a filtered digital PWM voltage signal to generate a filtered digital PWM voltage signal and produce the additional noise filtering; and
    applying by a digital scale factor (DSF) module, a gain to the filtered digital PWM voltage signal so as to generate the estimated acceleration signal.

17. The method of claim 16, wherein applying the gain includes multiplying a gain value to the filtered digital PWM voltage signal to produce the scaling which scales the estimated acceleration signal so as to reduce an error between the filtered digital PWM voltage signal and the acceleration.

18. The method of claim 12, wherein the robust loop-shaping stabilization operation further comprises:
    delivering the transducer signal to a robust loop-shaping stabilization module; and
    generating a nominal digital PWM voltage signal indicative of a non-filtered estimation of the acceleration based on the transducer signal;
    delivering, to a digital pulse-width modulation (DPWM) correction module, the temperature signal and the transducer voltage reference;
    generating DPWM correction signal a DPWM correction signal indicative of a real-time estimate of a small gap displacement in the proof-mass based on the temperature signal and the transducer voltage reference; and
    generating, by the controller, the corrected drive signal based on the nominal digital PWM voltage signal and the DPWM correction signal.

19. The method of claim 11, further comprising:
    deterministically estimating, by the controller, the acceleration based on the transducer signal, and;
    outputting, by the controller, an estimated acceleration signal indicative of the estimated the acceleration.

20. The method of claim 19, further comprising combining, by the controller, the nominal digital PWM voltage signal with the DPWM correction signal to generate the corrected drive signal.

* * * * *